United States Patent
Iwata et al.

(10) Patent No.: US 7,596,008 B2
(45) Date of Patent: Sep. 29, 2009

(54) POWER CONVERSION APPARATUS

(75) Inventors: Akihiko Iwata, Tokyo (JP); Makoto Seto, Tokyo (JP); Masaki Yamada, Tokyo (JP); Shigeki Harada, Tokyo (JP); Hiroshi Ito, Tokyo (JP); Tomoyuki Kawakami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 145 days.

(21) Appl. No.: 11/816,324

(22) PCT Filed: Feb. 21, 2006

(86) PCT No.: PCT/JP2006/303001
§ 371 (c)(1),
(2), (4) Date: Aug. 15, 2007

(87) PCT Pub. No.: WO2006/090675
PCT Pub. Date: Aug. 31, 2006

(65) Prior Publication Data
US 2008/0101101 A1    May 1, 2008

(30) Foreign Application Priority Data
Feb. 25, 2005  (JP)  ............................. 2005-050700

(51) Int. Cl.
*H02M 7/48*    (2007.01)
*H02M 7/493*    (2007.01)
(52) U.S. Cl. .......................................... 363/71; 307/75
(58) Field of Classification Search .................. 363/65, 363/71, 95, 98, 131, 132; 307/43, 72, 75, 307/82
See application file for complete search history.

(56) References Cited

U.S. PATENT DOCUMENTS

| | | | | |
|---|---|---|---|---|
| 6,031,746 | A * | 2/2000 | Steigerwald et al. | ........... 363/71 |
| 7,196,488 | B2 * | 3/2007 | Matsubara et al. | ........... 318/599 |
| 7,230,837 | B1 * | 6/2007 | Huang et al. | ................... 363/71 |

FOREIGN PATENT DOCUMENTS

| | | |
|---|---|---|
| JP | 2000-243636 | 9/2000 |
| JP | 2003-324990 | 11/2003 |
| JP | 2005-39931 | 2/2005 |

OTHER PUBLICATIONS

U.S. Appl. No. 11/816,029, filed Aug. 10, 2007, Iwata et al.
Mabuchi, M., et al.; Development of KP40F Solar Power Conditioner, *Omron Technics*, vol. 42, No. 2, (Serial No. 142), pp. 146-151, (2002).

* cited by examiner

*Primary Examiner*—Gary L Laxton
(74) *Attorney, Agent, or Firm*—Leydig, Voit & Mayer, Ltd.

(57) ABSTRACT

A power conversion apparatus includes a first single-phase inverter that uses as a DC power source a first DC voltage that is boosted from a solar light voltage by a boosting chopper circuit. The first single-phase inverter is arranged between two single-phase inverters that use second DC power sources that are supplied from the first DC power source. AC sides of the respective single-phase inverters are connected in series. A power conditioner thus configured provides an output voltage using the sum of the generated voltages of the respective single-phase inverters. Chopper circuits are connected between the first DC power source and the second DC power sources, and power is supplied to the second DC power sources from the first DC power source via switching devices in the single-phase inverters.

17 Claims, 15 Drawing Sheets

(a)

(b)

Td/To≦0.5

(a)

(b)

POWER CONVERSION APPARATUS

TECHNICAL FIELD

The present invention relates to a power conversion apparatus that converts DC power to AC power, and particularly to a power conversion apparatus used for a power conditioner or the like that links a decentralized power source to a system.

BACKGROUND ART

In a conventional power conditioner, for example, as seen in a solar power conditioner, the voltage from a decentralized power source that is a solar battery is boosted by using a chopper, and a PWM-controlled inverter is inserted onto the subsequent stage, thus generating an output AC voltage.

A basic operation of such a conventional power conditioner will be described hereinafter. DC power outputted from the solar battery drives an internal control power source of the power conditioner and thus enables an internal circuit to operate. The internal circuit has a chopper circuit and an inverter unit. The chopper circuit boosts the voltage of the solar battery to a voltage that is required for linking to the system. The inverter unit includes four switches and carries out PWM switching to form an output current having a phase synchronous with the system voltage. A strip-like waveform is outputted in this manner, and the time ratio for output is changed to control the average voltage of the output. The outputted voltage is averaged by a smoothing filter provided on the output side, and AC power is outputted to the system (see, for example, non-patent reference 1).

Non-patent reference 1: "Development of Solar Power Conditioner Type KP40F", OMRON TECHNICS, Vol. 42, No. 2 (Serial No. 142) 2002

DISCLOSURE OF THE INVENTION

Problems that the Invention is to Solve

In the conventional power conditioner, which links a solar light voltage to the system, the maximum value of output voltage of the inverter is decided by the magnitude of the boosted voltage by the chopper. Therefore, for example, in the case of outputting AC power of 200 V, a boosted DC voltage of 282 V or higher is necessary and a higher value is usually set in order to give an allowance. The output voltage of the solar light voltage is usually approximately 200 V or lower, and it needs to be boosted to 282 V or higher as described above. If the boosting rate increases, the power loss in the chopper unit increases and there is a problem that the overall efficiency of the power conditioner is lowered.

Also, since a sine-wave current and voltage is generated as an output by using the PWM switching operation of the inverter unit, a large smoothing filter is necessary on the output side and it is difficult to miniaturize the configuration of the apparatus.

This invention has been made in order to solve the above problems. It is an object of the invention to reduce power loss in each unit and improve conversion efficiency in a power conversion apparatus that converts power from a DC power source to AC and outputs AC to a system and load, and to provide a power conversion apparatus in which miniaturization of the configuration of the apparatus is facilitated.

Means for Solve the Problems

In a power conversion apparatus according to the invention, AC sides of plural single-phase inverters that convert DC power of DC power sources to AC power are connected in series, and an output voltage is controlled by using the sum of generated voltages from a predetermined combination selected from the plural single-phase inverters. First and second DC power sources that serve as inputs of first and second single-phase inverters having their AC sides connected next to each other, of the plural single-phase inverters, are connected to each other via a DC-DC converter. The DC-DC converter supplies power from the first DC power source having a higher voltage to the second DC power source having a lower voltage, via switching devices in the first and second single-phase inverters.

Advantage of the Invention

In such a power conversion apparatus, a smooth output voltage waveform can be provided accurately by a combination of the voltages of the single-phase inverters, and the filter on the output side can be miniaturized or omitted, thus enabling a small and inexpensive configuration of the apparatus. Also, between the DC power sources that serve as the inputs of the respective single-phase inverters, power is supplied from the first DC power source to the second DC power source, and the sum of the voltages of the single-phase inverters is used as an output. Therefore, the conversion efficiency is high and a high voltage can be outputted with small power loss. Also, since power is supplied from the first DC power source to the second DC power source by the DC-DC converter via the switching devices in the first and second single-phase inverters, power can be supplied by highly efficiency power transmission. This improves the conversion efficiency and enables provision of a power conversion apparatus configured to be small-sized and inexpensive.

BEST MODE FOR CARRYING OUT THE INVENTION

Embodiment 1

Hereinafter, a power conversion apparatus (hereinafter referred to as power conditioner) according to Embodiment 1 of the invention will be described with reference to the drawings.

Figure 1:
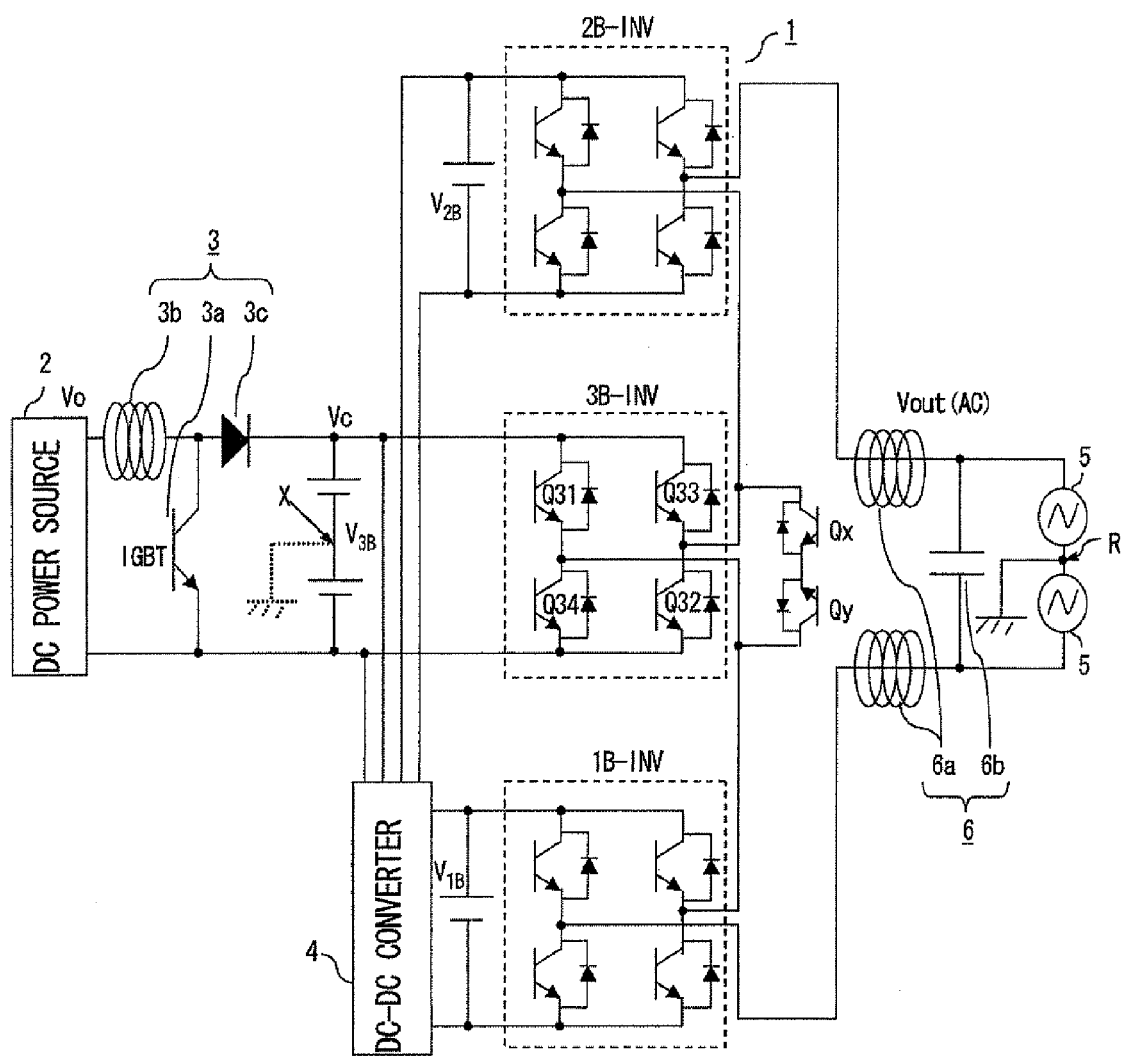
FIG. 1 is a schematic configuration view showing a power conditioner according to Embodiment 1 of the invention.

FIG. 1 is a schematic configuration view showing a power conditioner according to Embodiment 1 of the invention. As shown in FIG. 1, AC sides of plural (in this case, three) single-phase inverters 2B-INV, 3B-INV and 1B-INV are connected in series to form an inverter unit 1, which is a single-phase multiple converter. Each of the single-phase inverters 2B-INV, 3B-INV and 1B-INV includes plural self-turn-off semiconductor switching devices such as IGBTs with diodes connected in inverse-parallel. The single-phase inverter 1B-INV is connected to one of two terminals on the AC side of the single-phase inverter 3B-INV, which uses a DC power source $V_{3B}$ as its input, and the single-phase inverter 2B-INV is connected to the other terminal. Also, as short-circuit switches that form a short circuit between the two terminals on the AC sides of the single-phase inverter 3B-INV, two self-turn-off semiconductor switching devices Qx and Qy such as IGBTs, each of which having diodes connected in inverse-parallel, are connected parallel to the single-phase inverter 3B-INV.

Also, a boosting chopper circuit 3 including a switching device (hereinafter referred to as switch) 3a such as IGBT, a reactor 3b and a diode 3c is installed on a stage subsequent to a DC power source 2 based on solar light as a third DC power source. The boosting chopper circuit 3 boosts a DC voltage $V_o$ acquired at the DC power source 2 and thus provides a voltage (potential $V_c$) charging a smoothing capacitor, which serves as the DC power source $V_{3B}$.

The single-phase inverters 2B-INV, 3B-INV and 1B-INV convert DC power of the DC power sources $V_{2B}$, $V_{3B}$ and $V_{1B}$ to AC power and output it. The DC power source of their inputs are connected by a DC-DC converter 4. The DC-DC converter 4 will be described later in detail. The voltages of the DC power sources $V_{2B}$, $V_{3B}$ and $V_{1B}$ are described as $V_{2B}$, $V_{3B}$ and $V_{1B}$ for convenience.

The voltage of the DC power source $V_{3B}$, which serves as the input of the single-phase inverter 3B-INV, is higher than the voltages of the DC power sources $V_{2B}$ and $V_{1B}$, which serve as the inputs of the other single-phase inverters 2B-INV and 1B-INV. $V_{2B}$, $V_{3B}$ and $V_{1B}$ are controlled to hold a predetermined voltage ratio by the DC-DC converter 4. Hereinafter, the DC power source $V_{3B}$ is referred to as maximum DC power source $V_{3B}$, and the single-phase inverter 3B-INV is referred to as maximum single-phase inverter 3B-INV. Here, $V_{1B} = V_{2B} \geqq (2/9) \times V_{3B}$ holds. That is, the voltages of the DC power sources $V_{1B}$ and $V_{2B}$ of the inverters 1B-INV and 2B-INV are equal and the total of these two is equal to or larger than $(4/9) \times V_{3B}$.

These single-phase inverters 2B-INV, 3B-INV and 1B-INV can generate positive, negative and zero voltages as their outputs. The inverter unit 1 outputs a voltage $V_A$ as the sum of these generated voltages combined, by gradational output voltage control operation. This output voltage $V_A$ is smoothed by a smoothing filter 6 including a reactor 6a and a capacitor 6b and an AC voltage $V_{out}$ is supplied to a system 5. It is assumed that the system 5 has its mid-point R grounded by a pole mounted transformer.

Figure 2:
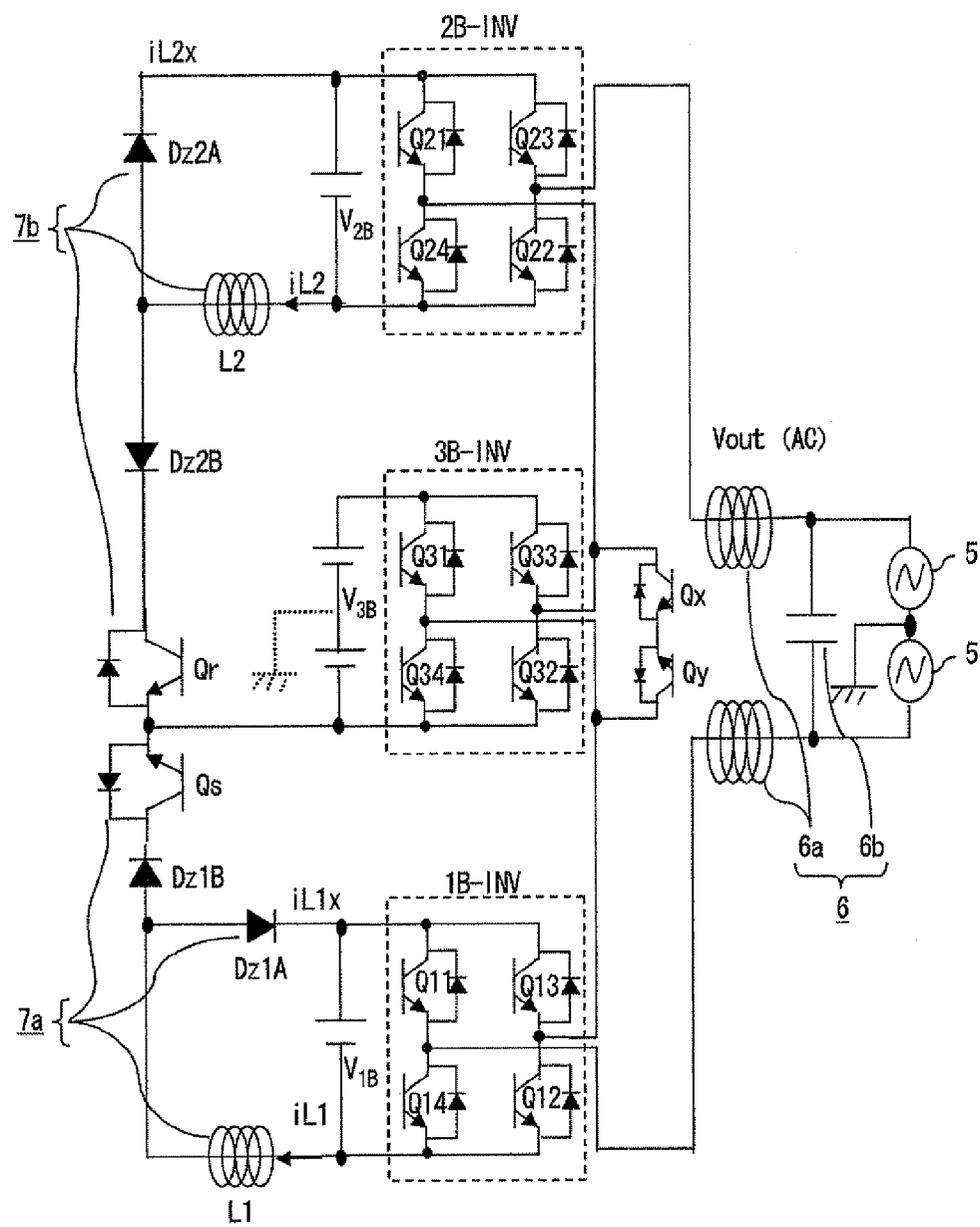
FIG. 2 is a view showing a circuit configuration of the power conditioner according to Embodiment 1 of the invention.

Next, the DC-DC converter 4 connecting the DC power sources $V_{2B}$, $V_{3B}$ and $V_{1B}$ will be described with reference to FIG. 2. FIG. 2 shows a circuit configuration including the DC-DC converter 4 of the power conditioner, but the DC power source 2 and the boosting chopper circuit 3 are not shown, for convenience. Here, the DC-DC converter 4 includes chopper circuits 7a and 7b. The chopper circuit 7a is connected between the maximum DC power source $V_{3B}$ and the DC power source $V_{1B}$, and the chopper circuit 7b is connected between the maximum DC power source $V_{3B}$ and the DC power source $V_{2B}$. The chopper circuits 7a, 7b include reactors L1, L2, diodes Dz1A, Dz2A, and switches Qs, Qr, respectively. Each of the chopper circuits functions as a DC-DC converter. Then, as the chopper circuit 7a operates, power is supplied from the maximum DC power source $V_{3B}$ to the DC power source $V_{1B}$ via the maximum single-phase inverter 3B-INV and the single-phase inverter 1B-INV. As the chopper circuit 7b operates, power is supplied from the maximum DC power source $V_{3B}$ to the DC power source $V_{2B}$ via the maximum single-phase inverter 3B-INV and the single-phase inverter 2B-INV. Also, diodes Dz1B, Dz2B are arranged to prevent a current from flowing backward directly to each potential of the DC power source $V_{1B}$ and DC power source $V_{2B}$ from the potential of the maximum DC power source $V_{3B}$.

Figure 3:
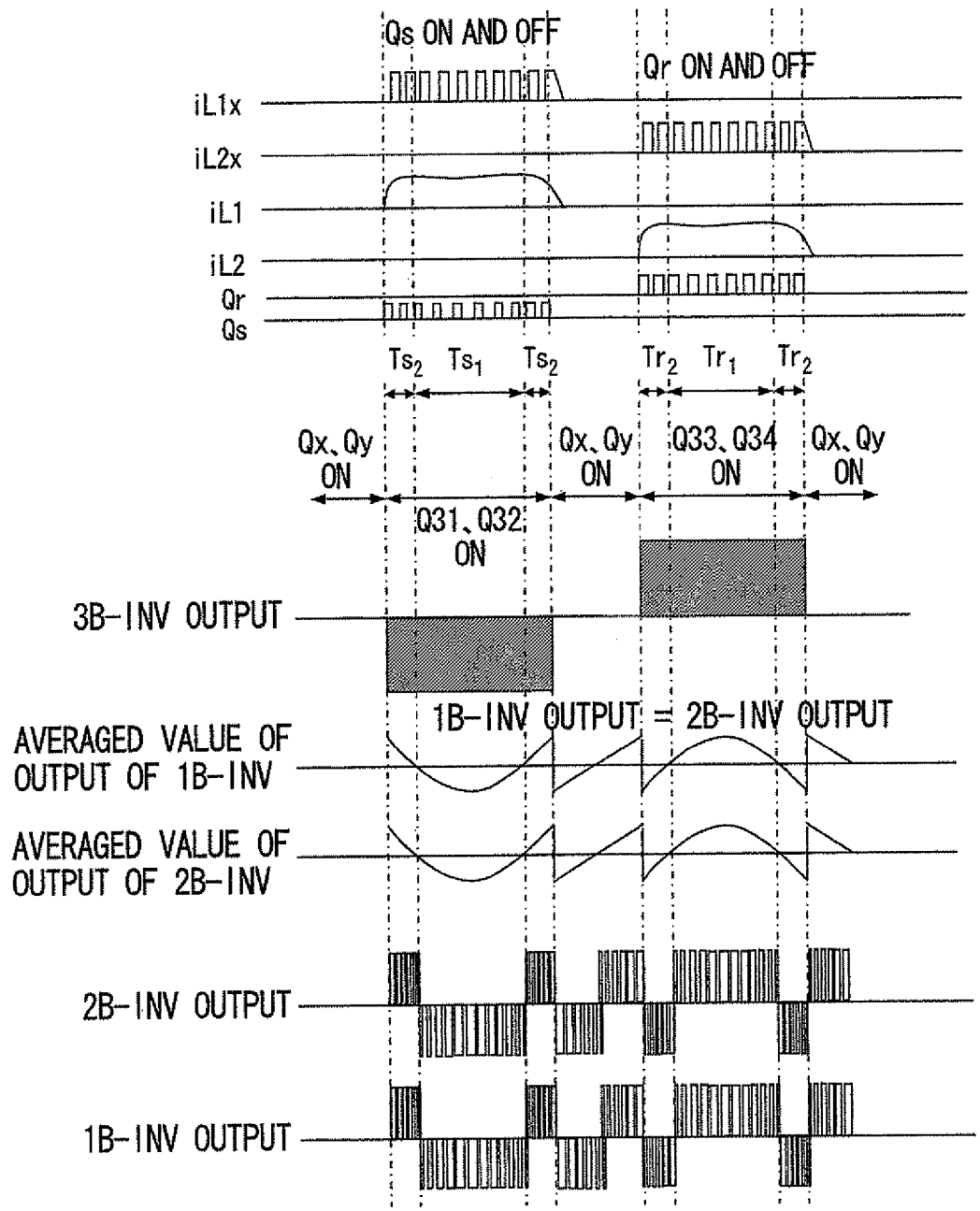
FIG. 3 is a view for explaining the operation of a DC-DC converter according to Embodiment 1 of the invention.

The operations of the single-phase inverters 2B-INV, 3B-INV and 1B-INV, and the chopper circuits 7a and 7b will be described with reference to FIG. 3. As shown in FIG. 3, the output of the single-phase inverter 1B-INV is equal to the output of the single-phase inverter 2B-INV, and the single-phase inverters 1B-INV and 2B-INV are PWM-controlled to produce outputs in order to compensate for the difference between the target output voltage and the output voltage of the maximum single-phase inverter 3B-INV. Practically, they are controlled to flow a current into the system 5. However, in the case where the output reactor 6a is small, the difference between the voltage acquired by averaging the output voltage $V_A$ of the inverter unit 1 and the system voltage is small, and these can be considered almost the same.

During the period when switching devices Q31 and Q32 of the maximum single-phase inverter 3B-INV are turned on and the maximum single-phase inverter 3B-INV is outputting a negative voltage, the switch Qs of the chopper circuit 7a is turned on and off. During a period $T_{S1}$ in this period, the single-phase inverter 1B-INV outputs a negative voltage under PWM control, and a switching device Q12 is turned on and switching devices Q11 and Q14 are alternately turned on. During this period $T_{S1}$, since the switching devices Q31 and Q12 are on, as the switch Qs is turned on and off, the reactor L1 is charged with a current iL1 flowing from the maximum DC power source $V_{3B}$ through the switching devices Q31 and Q12. Power is supplied to the DC power source $V_{1B}$ by a current iL1x flowing from the reactor L1 through the diode Dz1A.

During a period $T_{S2}$ in the period when the switching devices Q31 and Q32 are on, the single-phase inverter 1B-INV outputs a positive voltage under PWM control, and a switching device Q13 is turned on and the switching devices Q11 and Q14 are alternately turned on. During this period $T_{S2}$, as the switch Qs is turned on and off, the reactor L1 is charged with a current iL1 flowing from the maximum DC power source $V_{3B}$ through the switching device Q31, the inverse-parallel diodes of the switching device Q13, and the DC power source $V_{1B}$. Power is supplied to the DC power source $V_{1B}$ by a current iL1x flowing from the reactor L1 through the diode Dz1A.

In this manner, when the switching device Q31 of the maximum single-phase inverter 3B-INV is on and the positive electrode of the maximum DC power source $V_{3B}$ is connected to an AC output power line, as the switch Qs of the chopper circuit 7a is turned on and off, power can be supplied to the DC power source $V_{1B}$ from the maximum DC power source $V_{3B}$ via the maximum single-phase inverter 3B-INV and the single-phase inverter 1B-INV.

Meanwhile, during the period when switching devices Q33 and Q34 of the maximum single-phase inverter 3B-INV are turned on and the maximum single-phase inverter 3B-INV is outputting a positive voltage, the switch Qr of the chopper circuit 7b is turned on and off. During a period $T_{r1}$ in this period, the single-phase inverter 2B-INV outputs a positive voltage under PWM control, and a switching device Q24 is turned on and switching devices Q22 and Q23 are alternately turned on. During this period $T_{r1}$, since the switching devices Q33 and Q24 are on, as the switch Qr is turned on and off, the reactor L2 is charged with a current iL2 flowing from the maximum DC power source $V_{3B}$ through the switching devices Q33 and Q24. Power is supplied to the DC power source $V_{2B}$ by a current iL2x flowing from the reactor L2 through the diode Dz2A.

During a period $T_{r2}$ in the period when the switching devices Q33 and Q34 are on, the single-phase inverter 2B-INV outputs a negative voltage under PWM control, and a switching device Q21 is turned on and the switching devices Q22 and Q23 are alternately turned on. During this period $T_{r2}$, as the switch Qr is turned on and off, the reactor L2 is charged with a current iL2 flowing from the maximum DC power source $V_{3B}$ through the switching device Q33, the inverse-parallel diodes of the switching device Q21, and the DC power source $V_{2B}$. Power is supplied to the DC power source $V_{2B}$ by a current iL2x flowing from the reactor L2 through the diode Dz2A.

In this manner, when the switching device Q33 of the maximum single-phase inverter 3B-INV is on and the positive electrode of the maximum DC power source $V_{3B}$ is connected to an AC output power line, as the switch Qr of the chopper circuit 7b is turned on and off, power can be supplied to the DC power source $V_{2B}$ from the maximum DC power source $V_{3B}$ via the maximum single-phase inverter 3B-INV and the single-phase inverter 2B-INV.

During the period when the output voltage of the maximum single-phase inverter 3B-INV is zero, the semiconductor switches Qx and Qy that form a short circuit between the two terminals on the AC side of the maximum single-phase inverter 3B-INV are turned on into continuity and all the semiconductor switches Q31 to Q34 of the maximum single-phase inverter 3B-INV are turned off. In this case, since the single-phase inverter 1B-INV and the single-phase inverter 2B-INV are caused to operate to have the same output, the potential at the mid-point X of the maximum DC power source $V_{3B}$ is substantially equal to the ground potential, which is the intermediate potential of the output voltage $V_{out}$ of the power conditioner.

As described above, in this embodiment, an output voltage waveform that is accurately close to a sine wave can be provided by the combination of the generated voltages of the single-phase inverters 2B-INV, 3B-INV and 1B-INV. The smoothing filter 6 on the output side can be configured with a small capacity or it can be omitted, and the configuration of the apparatus can be miniaturized. Also, the maximum single-phase inverter 3B-INV, which uses as its DC power source the DC voltage $V_{3B}$ boosted from the solar light voltage $V_o$ by the boosting chopper circuit 3, and the single-phase inverters 2B-INV and 1B-INV, which use the DC power sources $V_{1B}$ and $V_{2B}$ supplied from this maximum DC power source $V_{3B}$ as their inputs, are connected to configure the power conditioner so that an output voltage is provided by using the sum of the generated voltages of the single-phase inverters. Therefore, a higher voltage than the DC voltage $V_{3B}$ boosted by the boosting chopper circuit 3 can be outputted efficiently.

Moreover, the DC-DC converter 4 is formed by the chopper circuits 7a and 7b including the reactors L1, L2, the rectifying devices Dz1A, Dz2A and the switches Qs, Qr, and the chopper circuits 7a and 7b supply power from the maximum DC power source $V_{3B}$ to the DC power sources $V_{1B}$ and $V_{2B}$ via the switching devices in the single-phase inverters. Therefore, there is no reduction in efficiency due to leakage inductance and exciting inductance, which can occur in power transmission using a transformer. Power can be supplied by highly efficient power transmission and the voltages of the DC power sources $V_{1B}$ and $V_{2B}$ can be set. Therefore, the overall efficiency of the power conditioner improves further. In this manner, a power conditioner with improved conversion efficiency and with a small and inexpensive configuration can be provided.

Also, during the period when the switching devices Q31 and Q33 are on so that the maximum single-phase inverter 3B-INV connects the positive electrode of the maximum DC power source $V_{3B}$ to the AC output power line, the chopper circuits 7a and 7b turn on and off the switches Qs and Qr to charge the reactors L1 and L2, and power can be securely supplied to the DC power sources $V_{1B}$ and $V_{2B}$ by the current flowing through the diodes Dz1A and Dz2A from the reactors L1 and L2.

Moreover, since the single-phase inverters 2B-INV and 1B-INV are arranged and connected to both sides of the maximum single-phase inverter 3B-INV, which is at the center between them, power can be supplied easily and effectively from the maximum DC power source $V_{3B}$ of the maximum single-phase inverter 3B-INV to the DC power sources $V_{1B}$ and $V_{2B}$ of the single-phase inverters 2B-INV and 1B-INV on the both sides of the inverter 3B-INV.

Embodiment 2

Figure 4:
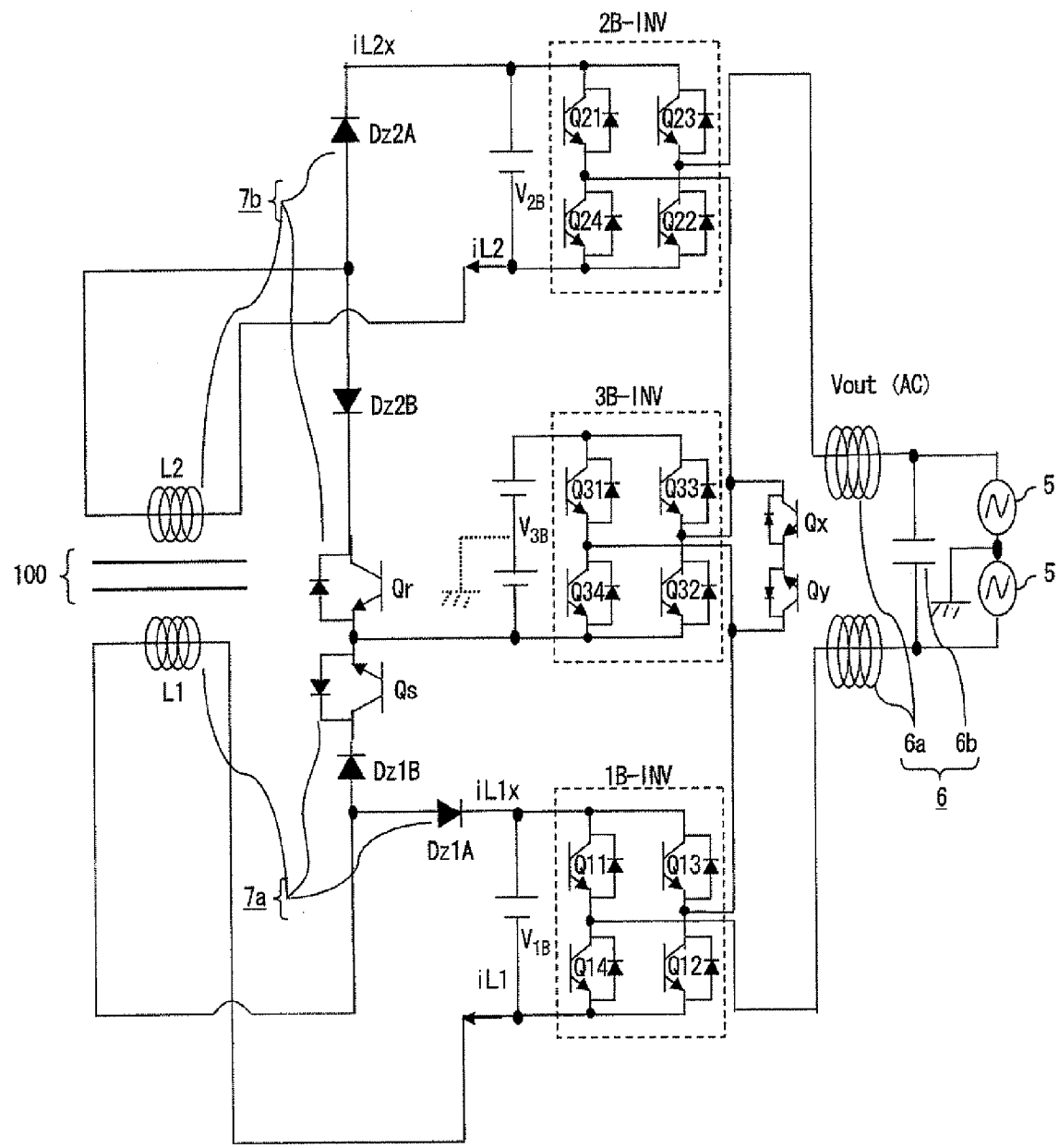
FIG. 4 is a view showing a power conditioner according to Embodiment 2 of the invention.

Next, a power conditioner according to Embodiment 2 of the invention will be described hereinafter with reference to FIG. 4. As shown in FIG. 4, as in the above Embodiment 1, the DC-DC converter 4 is formed by the chopper circuits 7a and 7b including the reactors L1, L2, the rectifying devices Dz1A, Dz2A and the switches Qs, Qr. However, in this embodiment, the reactors L1 and L2 of the chopper circuits 7a and 7b are magnetically coupled by a magnetic coupling core 100 made of a magnetic material.

The configuration except for the magnetic coupling of the reactors L1 and L2 is similar to the above Embodiment 1. Also, FIG. 4 does not show the DC power source 2 and the boosting chopper circuit 3, for convenience.

Next, the operation will be described.

As described in the above Embodiment 1, when the maximum single-phase inverter 3B-INV outputs a negative voltage, the switch Qs of the chopper circuit 7a is turned on and off to supply power to the DC power source $V_{1B}$. However, the energy accumulated in the reactor L1 by the operation of the chopper circuit 7a can be shifted to the reactor L2 of the chopper circuit 7b at the rate of the magnetic coupling. Therefore, the energy can be used both by the chopper circuits 7a and 7b and power can be supplied not only to the DC power source $V_{1B}$ but also to the DC power source $V_{2B}$. Similarly, when the maximum single-phase inverter 3B-INV outputs a positive voltage, the switch Qr of the chopper circuit 7b is turned on and off and the energy accumulated in the reactor L2 is shifted to the reactor L1 at the rate of the magnetic coupling. Thus, power can be supplied not only to the DC power source $V_{2B}$ but also to the DC power source $V_{1B}$.

In the power conditioner described in the above Embodiment 1, the DC power sources $V_{1B}$ and $V_{2B}$ are supplied with power only during a half-period of one basic AC wave cycle.

However, in this embodiment, the DC power sources $V_{1B}$ and $V_{2B}$ can be charged during the period when the maximum single-phase inverter 3B-INV is outputting, all the time during one basic AC wave cycle. Therefore, the rate of use of the DC-DC converter 4 (chopper circuits 7a and 7b) improves.

Also, in the above Embodiment 1, the chopper circuits 7a and 7b must supply the energy necessary for the DC power sources $V_1$, and $V_{2B}$ in one cycle, within a half-period. However, in this embodiment, since power can be supplied all the time during one cycle, the energy to be handled can be averaged, the current peak value can be reduced, and the loss can be reduced. Also, since there is no need to flow a large current, the magnetic coupling core 100 may be small. Moreover, compared with the above Embodiment 1, where the DC power sources $V_{1B}$ and $V_{2B}$ are alternately supplied with power every half-period, imbalance between the voltages of the DC power source $V_{1B}$ and the DC power source $V_{2B}$ can be restrained and fluctuation of the mid-point potential of the maximum single-phase inverter 3B-INV can be restrained. Thus, in the case where the maximum DC power source $V_{3B}$ is connected to the solar battery (DC power source 2), occurrence of a leakage current can be restrained.

A case where the polarities of electromotive forces induced by the reactors L1 and L2 are in the same direction in the power conditioner according to the above Embodiment 2 will be described hereinafter with reference to FIG. 5.

Figure 5:
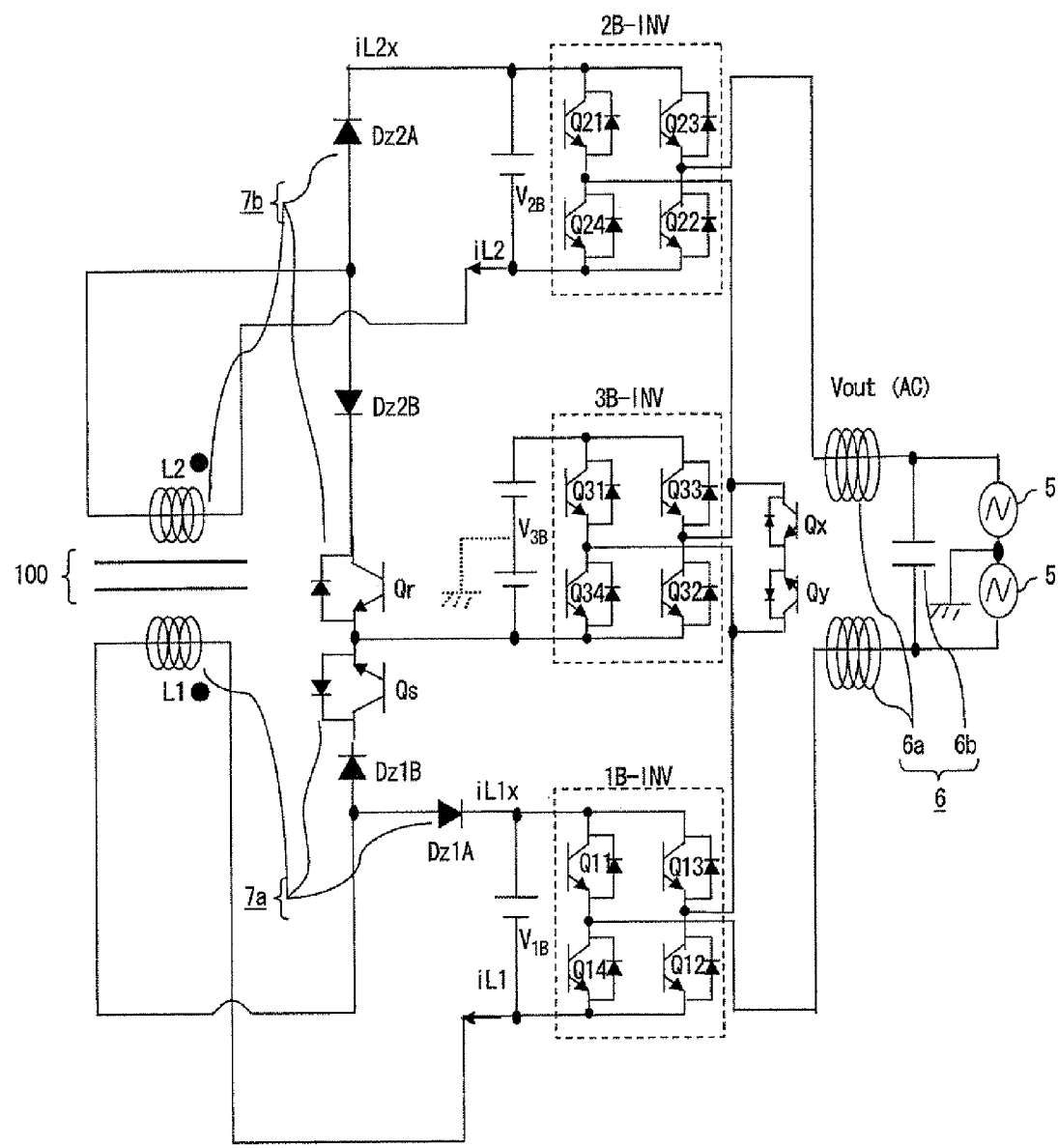
FIG. 5 is a view showing an exemplary DC-DC converter according to Embodiment 2 of the invention.

As shown in FIG. 5, the reactors L1 and L2 of the chopper circuits 7a and 7b are magnetically coupled by the magnetic coupling core 100 made of a magnetic material. In this case, the reactors L1 and L2 have their windings formed in such a manner that the polarities of electromotive forces induced by the two reactors L1 and L2 are in the same direction.

Figure 6:
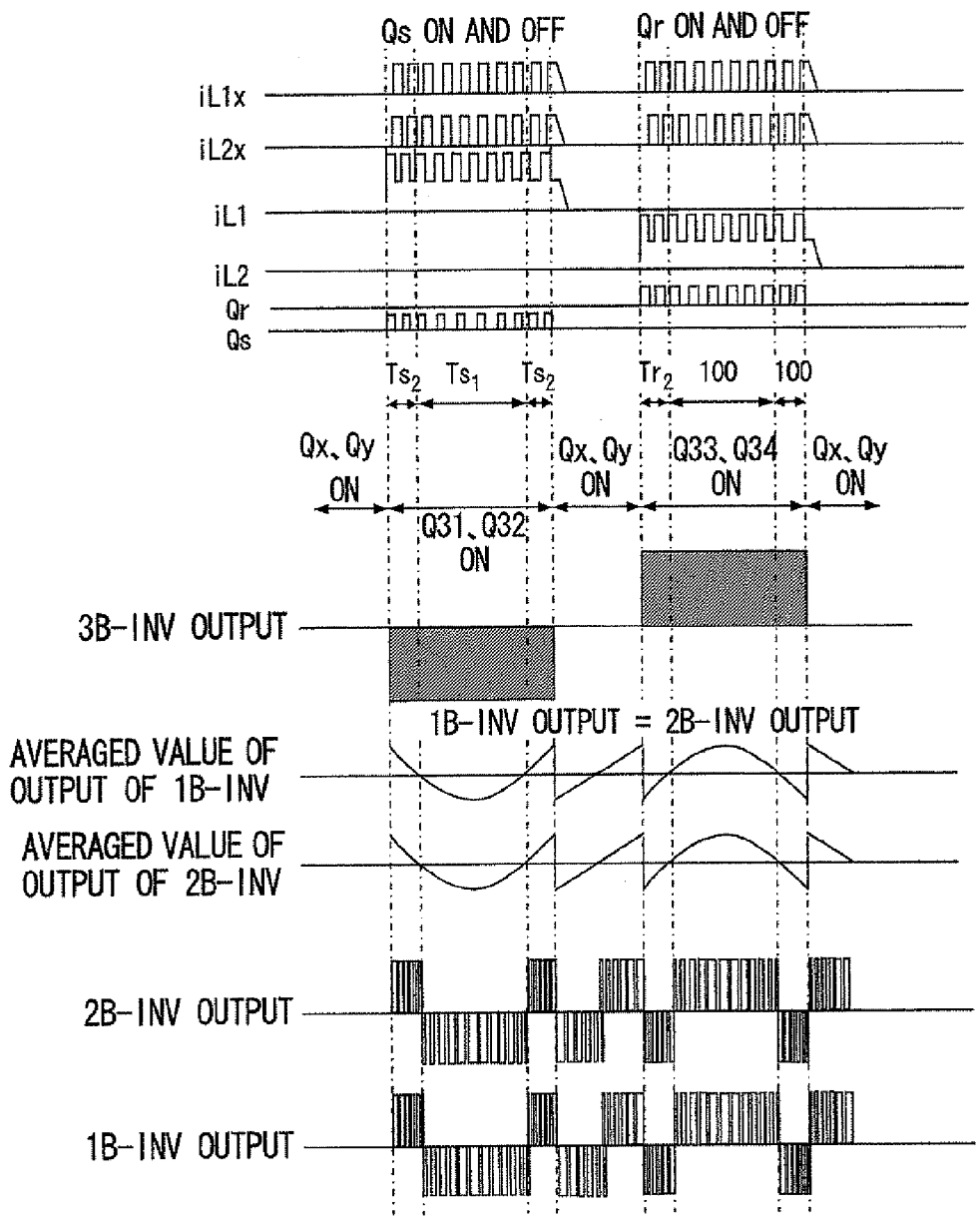
FIG. 6 is a view showing the operation of the DC-DC converter according to Embodiment 2 of the invention.

The operations of the single-phase inverters 2B-INV, 3B-INV and 1B-INV, and the chopper circuits 7a and 7b in the power conditioner shown in FIG. 5 will be described with reference to FIG. 6. As in the above Embodiment 1, the output of the single-phase inverter 1B-INV and the output of the single-phase inverter 2B-INV are equal, and the single-phase inverters 1B-INV and 2B-INV are caused to produce outputs under PWM control in order to compensate for the difference between the target output voltage and the output voltage of the maximum single-phase inverter 3B-INV.

When the switching devices Q31 and Q32 of the maximum single-phase inverter 3B-INV are turned on and the maximum single-phase inverter 3B-INV is outputting a negative voltage, the switch Qs of the chopper circuit 7a is turned on and off. During a period $T_{S1}$ in this period, the single-phase inverter 1B-INV outputs a negative voltage under PWM control, and during a period $T_{S2}$, the single-phase inverter 1B-INV outputs a positive voltage under PWM control. In both periods, as the switch Qs is turned on and off, the DC power sources $V_{1B}$ and $V_{2B}$ are supplied with power from the maximum DC power source $V_{3B}$ in the following manner.

When the switch Qs is on, during the period $T_{S1}$, a current iL1 flows from the maximum DC power source $V_{3B}$ through the switching devices Q31 and Q12, and during the period $T_{S2}$, a current iL1 flows from the maximum DC power source $V_{3B}$ through the switching device Q31, the inverse-parallel diodes of the switching device Q13, and the DC power source $V_{1B}$. This current iL1 charges the reactor L1 of the chopper circuit 7a and accumulates energy there, and the energy is shifted also to the reactor L2 of the chopper circuit 7b, which is magnetically connected with the reactor L1. At this time, a voltage of the same polarity is generated in the reactor L2 as in the reactor L1. However, since the diode Dz2A interrupts the current, a current iL2 will not be generated.

When the switch Qs is turned off, the reactors L1 and L2 cause currents iL1x and iL2x based on the accumulated energy, respectively, and supply power to the DC power sources $V_{1B}$ and $V_{2B}$. In this manner, as the switch Qs of the chopper circuit 7a is switched, power can be supplied to the DC power sources $V_{1B}$ and $V_{2B}$ of the two single-phase inverters 1B-INV and 2B-INV.

When the switching devices Q33 and Q34 of the maximum single-phase inverter 3B-INV are turned on and the maximum single-phase inverter 3B-INV is outputting a positive voltage, the switch Qr of the chopper circuit 7b is turned on and off. During a period $T_{r1}$ in this period, the single-phase inverter 2B-INV outputs a positive voltage under PWM control, and during a period $T_{r2}$, the single-phase inverter 2B-INV outputs a negative voltage under PWM control. In both periods, as the switch Qr is turned on and off, the DC power sources $V_{1B}$ and $V_{2B}$ are supplied with power from the maximum DC power source $V_{3B}$ in the following manner.

When the switch Qr is on, during the period $T_{r1}$, a current iL2 flows from the maximum DC power source $V_{3B}$ through the switching devices Q33 and Q24, and during the period $T_{r2}$, a current iL2 flows from the maximum DC power source $V_{3B}$ through the switching device Q33, the inverse-parallel diodes of the switching device Q21, and the DC power source $V_{2B}$. This current iL2 charges the reactor L2 of the chopper circuit 7b and accumulates energy there, and the energy is shifted also to the reactor L1 of the chopper circuit 7a, which is magnetically connected with the reactor L2. At this time, a voltage of the same polarity is generated in the reactor L1 as in the reactor L2. However, since the diode Dz1B interrupts the current, a current iL1 will not be generated.

When the switch Qr is turned off, the reactors L1 and L2 cause currents iL1x and iL2x based on the accumulated energy, respectively, and supply power to the DC power sources $V_{1B}$ and $V_{2B}$. In this manner, as the switch Qr of the chopper circuit 7b is switched, power can be supplied to the DC power sources $V_{1B}$ and $V_{2B}$ of the two single-phase inverters 1B-INV and 2B-INV.

Next, a case where the polarities of electromotive forces induced by the reactors L1 and L2 are in the opposite directions in the power conditioner according to the above Embodiment 2 will be described hereinafter with reference to FIG. 7.

Figure 7:
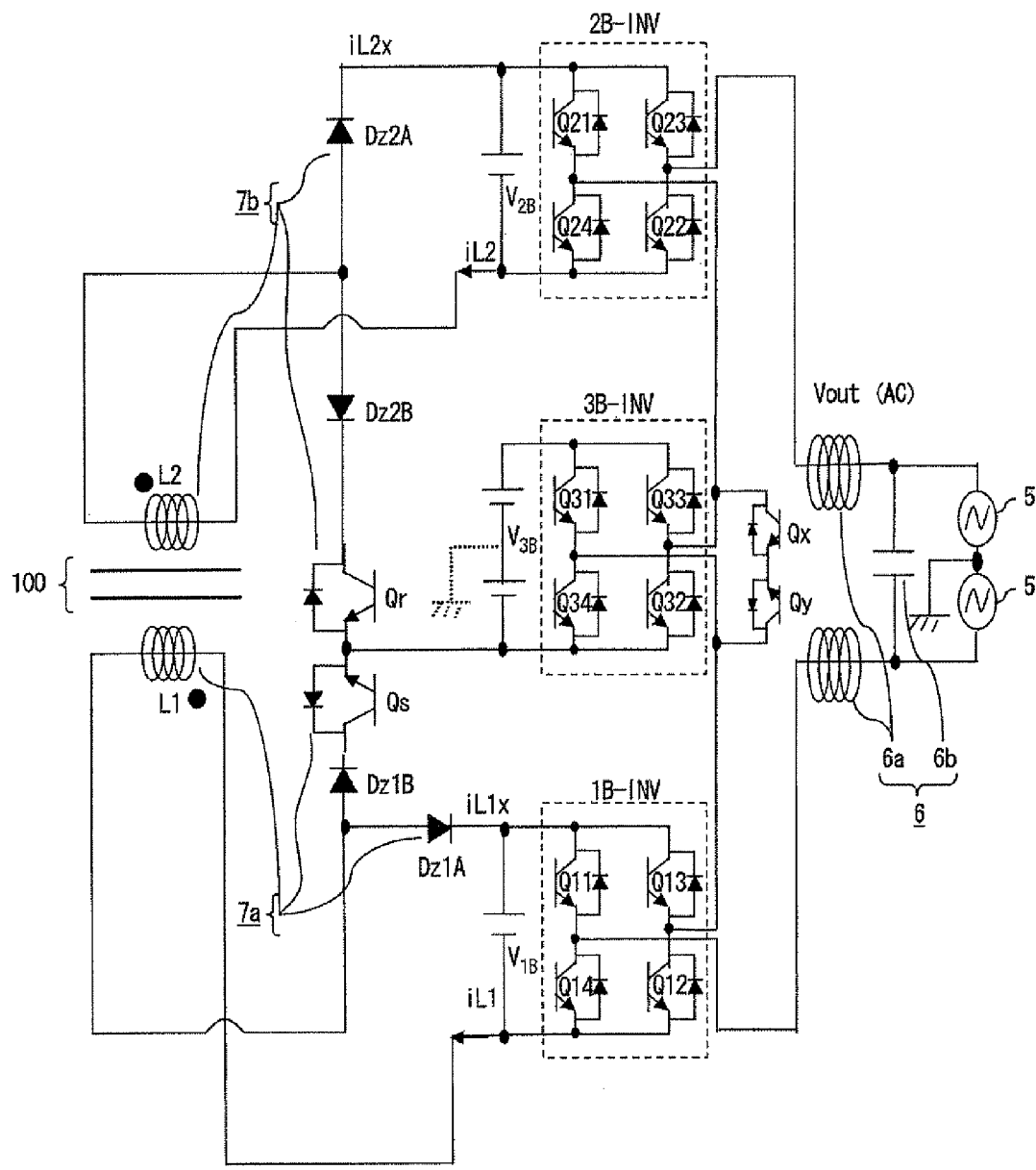
FIG. 7 is a view showing another exemplary DC-DC converter according to Embodiment 2 of the invention.

As shown in FIG. 7, the reactors L1 and L2 of the chopper circuits 7a and 7b are magnetically coupled by the magnetic coupling core 100 made of a magnetic material. In this case, the windings of the reactors L1 and L2 are formed in such a manner that the polarities of electromotive forces induced by the two reactors L1 and L2 are in the opposite directions, and a gap is provided in the magnetic coupling core 100 to adjust the strength of the magnetic coupling.

The operation of supplying power to the DC power sources $V_{1B}$ and $V_{2B}$ from the maximum DC power source $V_{3B}$ in the power conditioner shown in FIG. 7 will be described hereinafter.

When the switching devices Q31 and Q32 of the maximum single-phase inverter 3B-INV are on and the maximum single-phase inverter 3B-INV is outputting a negative output, if the switch Qs of the chopper circuit 7a is turned on and off, the reactor L1 is charged, but a voltage of the opposite polarity to the reactor L1 is generated in the reactor L2. By this voltage generated in the reactor L2, a current iL2x is caused to flow via the diode Dz2A to supply power to the DC power source $V_{2B}$. The operation of supplying power to the DC power source $V_{1B}$ in this case is similar to the case shown in FIG. 5.

Although the DC power source $V_{2B}$ can be charged by the voltage generated in the reactor L2, if the voltage difference between the DC power source $V_{3B}$ and the DC power source $V_{2B}$ is large, a rush current flows into the DC power source $V_{2B}$. Thus, to prevent this, the gap provided in the magnetic coupling core 100 adjusts the strength of the magnetic coupling between the reactor L1 and the reactor L2.

Similarly, when the maximum single-phase inverter 3B-INV is outputting a positive voltage, if the switch Qr of the chopper circuit 7b is turned on and off, the reactor L2 is charged, and a voltage of the opposite polarity to the reactor L2 is generated in the reactor L1. By this voltage generated in the reactor L1, power is supplied to the DC power source $V_{1B}$ and both the DC power sources $V_{1B}$ and $V_{2B}$ can thus be supplied with power. Also in this case, the gap provided in the magnetic coupling core 100 prevents a rush current from flowing into the DC power source $V_{1B}$.

Embodiment 3

In the above Embodiments 1 and 2, the maximum single-phase inverter 3B-INV is arranged at the center. A case where the inverters are arranged in ascending order of the voltages of DC power sources $V_{1B}$, $V_{2B}$ and $V_{3B}$ that serve as their inputs, will be described hereinafter with reference to FIG. 8.

Figure 8:
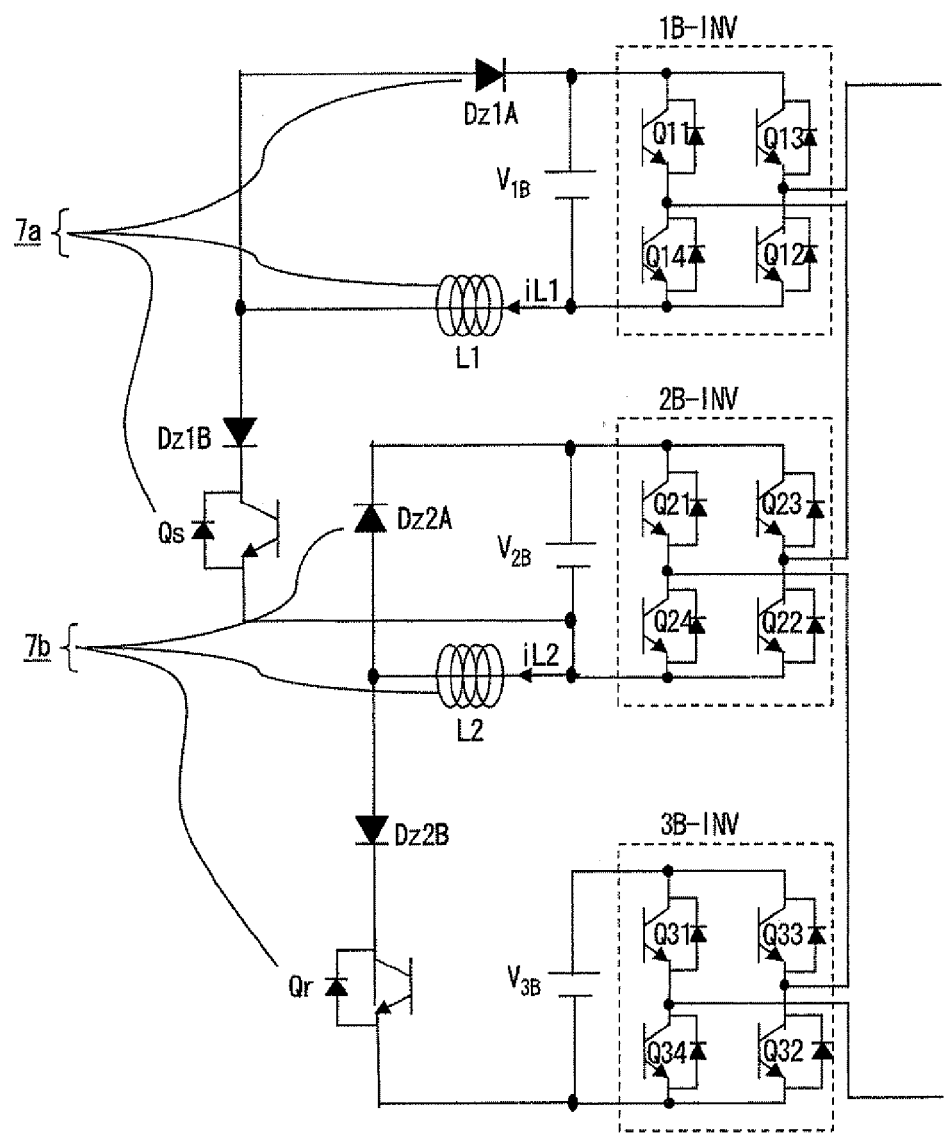
FIG. 8 is a view showing a circuit configuration of a power conditioner according to Embodiment 3 of the invention.

Also in this case, the maximum DC power source $V_{3B}$ of the maximum single-phase inverter 3B-INV is generated as the DC voltage $V_o$ acquired at the DC power source 2 based on solar light as the third DC power source is boosted by the boosting chopper circuit 3. In FIG. 8, the DC power source 2 and the boosting chopper circuit 3 are not shown, for convenience. The voltages $V_{1B}$, $V_{2B}$ and $V_{3B}$ of the DC power sources are controlled to hold a predetermined voltage ratio by the DC-DC converter 4 (see FIG. 1). Here, $V_{1B}:V_{2B}:V_{3B}=1:3:9$ holds.

The DC-DC converter 4 includes chopper circuits 7a and 7b. The chopper circuit 7a is connected between the DC power source $V_{2B}$ and the DC power source $V_{1B}$, and the chopper circuit 7b is connected between the maximum DC power source $V_{3B}$ and the DC power source $V_{2B}$. The chopper circuits 7a, 7b include reactors L1, L2, diodes Dz1A, Dz2A, and switches Qs, Qr, respectively. Each of the chopper circuits functions as a DC-DC converter. Then, as the chopper circuit 7b operates, power is supplied from the maximum DC power source $V_{3B}$ to the DC power source $V_{2B}$ via the maximum single-phase inverter 3B-INV and the single-phase inverter 2B-INV. As the chopper circuit 7a operates, power is supplied from the DC power source $V_{2B}$ to the DC power source $V_{1B}$ via the single-phase inverter 2B-INV and the single-phase inverter 1B-INV. Also, diodes Dz1B, Dz2B are arranged to prevent a current from flowing backward directly from the potential of the DC power source $V_{2B}$ to the potential of the DC power source $V_{1B}$ and from the potential of the maximum DC power source $V_{3B}$ to the potential of the DC power source $V_{2B}$.

Figure 9:
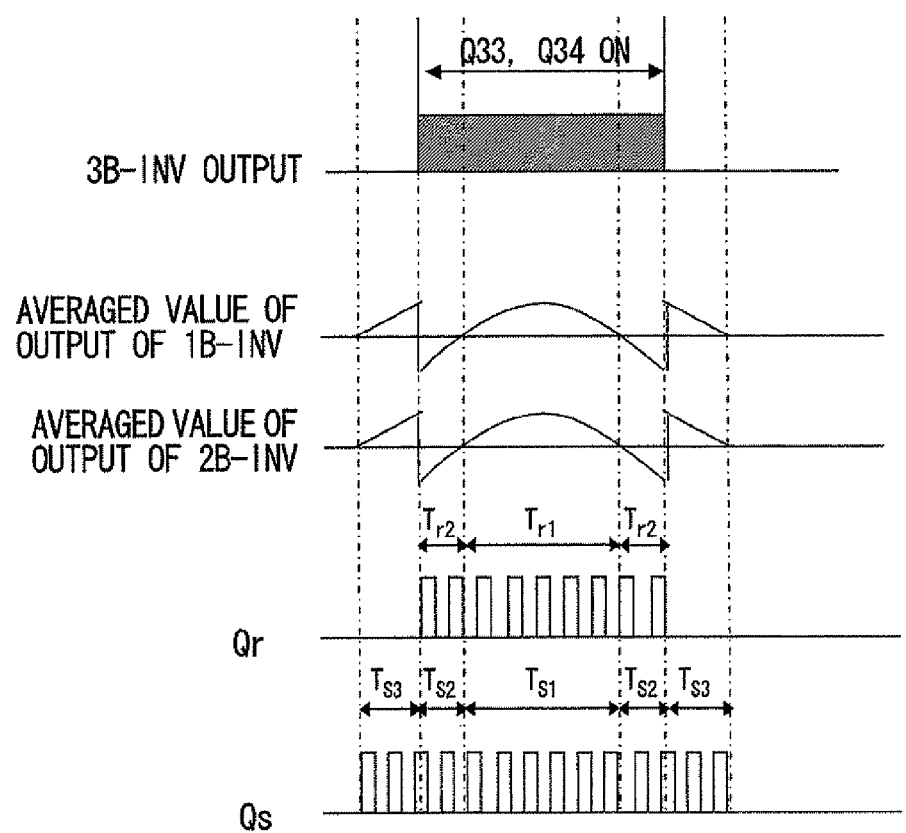
FIG. 9 is a view showing for explaining the operation of a DC-DC converter according to Embodiment 3 of the invention.

The operations of the single-phase inverters 1B-INV, 2B-INV and 3B-INV, and the chopper circuits 7a and 7b will be described with reference to FIG. 9. As shown in FIG. 9, the single-phase inverters 1B-INV and 2B-INV are PWM-controlled to produce outputs in order to compensate for the difference between the target output voltage and the output voltage of the maximum single-phase inverter 3B-INV. Here, it is described that the output of the single-phase inverter 1B-INV and the output of the single-phase inverter 2B-INV are equal, but it is not limited to this.

When switching devices Q33 and Q34 of the maximum single-phase inverter 3B-INV are turned on and the maximum single-phase inverter 3B-INV is outputting a positive voltage, the switch Qr of the chopper circuit 7b is turned on and off. During a period $T_{r1}$ in this period, the single-phase inverter 2B-INV outputs a positive voltage under PWM control, and a switching device Q24 is turned on and switching devices Q22 and Q23 are alternately turned on. During this period $T_{r1}$, since the switching devices Q33 and Q24 are on, as the switch Qr is turned on and off, the reactor L2 is charged with a current iL2 flowing from the maximum DC power source $V_{3B}$ through the switching devices Q33 and Q24. Power is supplied to the DC power source $V_{2B}$ by a current iL2x flowing from the reactor L2 through the diode Dz2A.

During a period $T_{r2}$ in the period when the switching devices Q33 and Q34 are on, the single-phase inverter 2B-INV outputs a negative voltage under PWM control, and a switching device Q21 is turned on and the switching devices Q22 and Q23 are alternately turned on. During this period $T_{r2}$, as the switch Qr is turned on and off, the reactor L2 is charged with a current iL2 flowing from the maximum DC power source $V_{3B}$ through the switching device Q33, the inverse-parallel diodes of the switching device Q21, and the DC power source $V_{2B}$. Power is supplied to the DC power source $V_{2B}$ by a current iL2x flowing from the reactor L2 through the diode Dz2A.

In this manner, when the switching device Q33 of the maximum single-phase inverter 3B-INV is on and the positive electrode of the maximum DC power source $V_{3B}$ is connected to an AC output power line, as the switch Qr of the chopper circuit 7b is turned on and off, power can be supplied to the DC power source $V_{2B}$ from the maximum DC power source $V_{3B}$ via the maximum single-phase inverter 3B-INV and the single-phase inverter 2B-INV.

Meanwhile, when the single-phase inverter 2B-INV is outputting a positive or negative voltage, the switch Qs of the chopper circuit 7a is turned on and off During a period $T_{S1}$ and a period $T_{S3}$ in this period, each of the single-phase inverters 1B-INV and 2B-INV outputs a positive voltage under PWM control, and switching devices Q14 and Q24 are turned on and switching devices Q12 and Q13 and the switching devices Q22 and Q23 are alternately turned on. During these periods $T_{S1}$ and $T_{S3}$, when the switching devices Q23 and Q14 are on, as the switch Qs is turned on and off, the reactor L1 is charged with a current iL1 flowing from the DC power source $V_{2B}$ through the switching devices Q23 and Q14. Power is supplied to the DC power source $V_{1B}$ by a current flowing from the reactor L1 through the diode Dz1A.

Also, during the period $T_{S2}$, each of the single-phase inverters 1B-INV and 2B-INV outputs a negative voltage under PWM control, and switching devices Q11 and Q21 are turned on and the switching devices Q12 and Q13 and the switching devices Q22 and Q23 are alternately turned on. During this period $T_{S2}$, when the switching device Q23 is on, as the switch Qs is turned on and off, the reactor L1 is charged with a current iL1 flowing from the DC power source $V_{2B}$ through the switching device Q23, the inverse-parallel diodes of the switching device Q11, and the DC power source $V_{1B}$. Power is supplied to the DC power source $V_{1B}$ by a current flowing from the reactor L1 through the diode Dz1A.

In this manner, when the switching device Q23 of the single-phase inverter 2B-INV is on and the positive electrode of the DC power source $V_{2B}$ is connected to an AC output power line, as the switch Qs of the chopper circuit 7a is turned on and off, power can be supplied to the DC power source $V_{1B}$ from the DC power source $V_{2B}$ via the single-phase inverter 2B-INV and the single-phase inverter 1B-INV.

In this embodiment, too, a power conditioner with improved conversion efficiency and with a small and inexpensive configuration can be provided.

Also, in this embodiment, the maximum single-phase inverter 3B-INV is arranged at an end, and power is supplied from the maximum DC power source $V_{3B}$ of the maximum single-phase inverter 3B-INV to the DC power source $V_{2B}$ of the single-phase inverter 2B-INV connected next to the inverter 3B-INV. Moreover, power is supplied from the DC power source $V_{2B}$ of the single-phase inverter 2B-INV to the DC power source $V_{1B}$ of the single-phase inverter 1B-INV connected next to the inverter 2B-INV. Since the DC power sources $V_{2B}$ and $V_{1B}$ other than the maximum DC power source $V_{3B}$ are supplied with power from the DC power sources $V_{3B}$ and $V_{2B}$ of the single-phase inverters 3B-INV and 2B-INV connected next to each other in the direction toward higher voltage of the DC power sources, the DC power sources $V_{2B}$ and $V_{1B}$ other than the maximum DC power source $V_{3B}$ can be supplied with power easily and securely, and the voltages of the DC power sources $V_{1B}$ and $V_{2B}$ can be set.

In the above Embodiment 3, three single-phase inverters are used, but two, four or more may be used. If these inverters are arranged in ascending or descending order of voltages of the DC power sources that serve as their inputs and the maximum single-phase inverter is arranged at an end, the DC power sources other than the maximum DC power source can be supplied with power easily and securely, as in the above embodiment.

Embodiment 4

In the above embodiments, the DC-DC converter 4 is formed by the chopper circuits 7a and 7b. A case of using a bidirectional DC-DC converter formed with a transformer will be described hereinafter. The main circuit configuration of the power conversion apparatus is similar to the configuration shown in FIG. 1. Alternatively, the single-phase inverters may be arranged in ascending or descending order of voltages of the DC power sources that serve as their inputs, and the switching devices Qx and Qy may be deleted.

Figure 10:
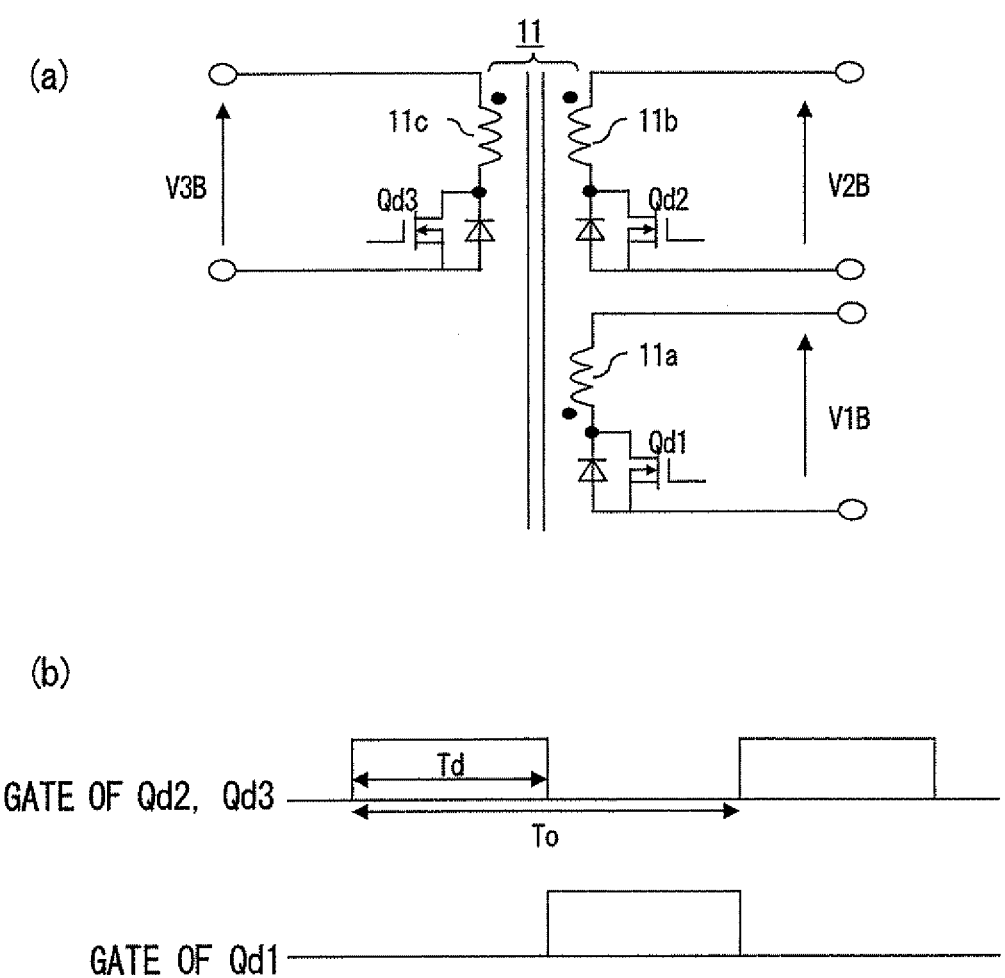
FIGS. 10(a) and 10(b) are a view showing a bidirectional DC-DC converter according to Embodiment 4 of the invention and a timing chart of gate voltage.
Figure 11:
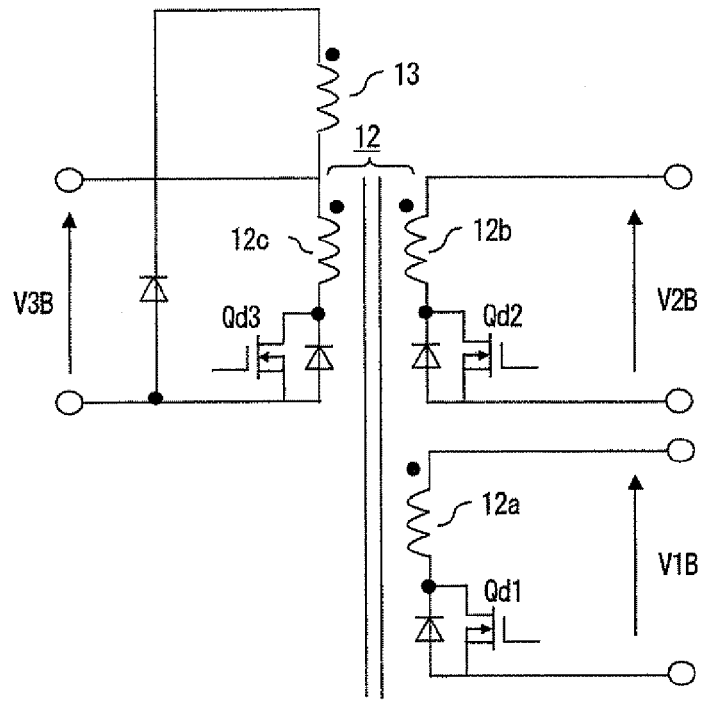
FIGS. 11(a) and 11(b) are a view showing a bidirectional DC-DC converter according to another example of Embodiment 4 of the invention and a timing chart of gate voltage.
Figure 11:
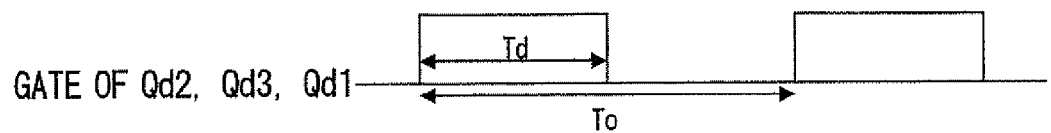
Figure 12:
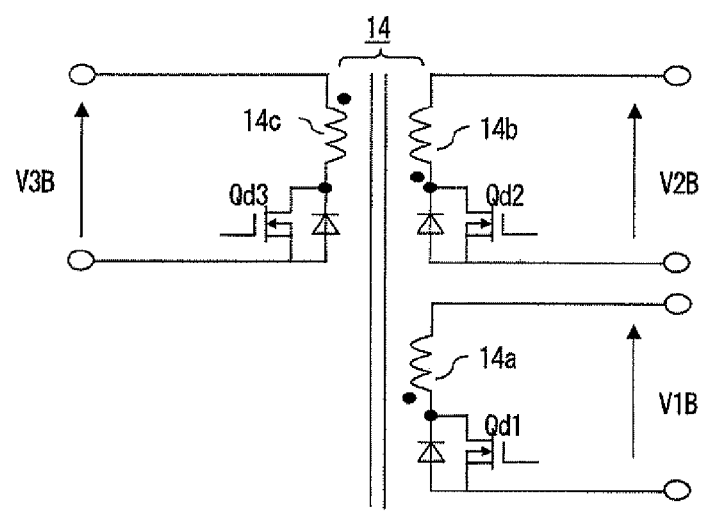
FIGS. 12(a) and 12(b) are a view showing a bidirectional DC-DC converter according to second another example of Embodiment 4 of the invention and a timing chart of gate voltage.
Figure 12:
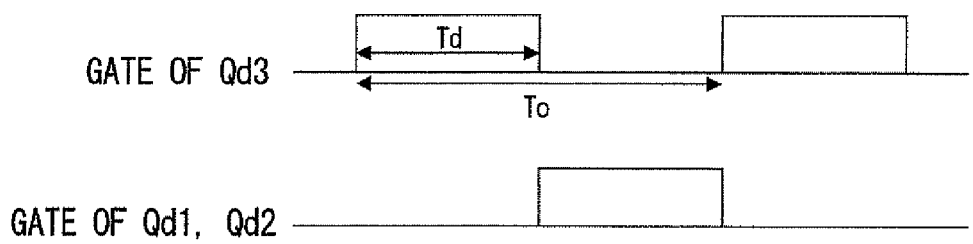

Three exemplary configurations of the bidirectional DC-DC converter that connects the DC power sources $V_{1B}$, $V_{2B}$ and $V_{3B}$ are shown in FIG. 10 to FIG. 12.

A bidirectional DC-DC converter 11 shown in FIG. 10(a) includes transformers and switches Qd1, Qd2 and Qd3. Windings 11a, 11b and 11c of the transformers connected to the DC power sources $V_{1B}$, $V_{2B}$ and $V_{3B}$ are connected in such a manner that a forward converter is formed between the maximum DC power source $V_{3B}$ and the DC power source $V_{2B}$ and a fly-back converter is formed between the maximum DC power source $V_{3B}$ and the DC power source $V_{1B}$. Their DC voltage ratio is $V_{1B}:V_{2B}:V_{3B}=1:3:9$.

FIG. 10(b) shows gate voltages that serve as driving signals of the switches Qd1, Qd2 and Qd3.

The gate voltage of the switch Qd3 and the gate voltage of the switch Qd1 are in the inverse relation, and the relation between the voltages $V_{3B}$ and $V_{1B}$ is defined as 9:1 by the values of Td and the ratio of the number of turns of the transformers. In this case, if the relation between the voltages $V_{3B}$ and $V_{1B}$ is $V_{3B}>9V_{1B}$, power is transmitted from the maximum DC power source $V_{3B}$ to the DC power source $V_{1B}$, and if it is $V_{3B}<9V_{1B}$, power is transmitted from the DC power source $V_{1B}$ to the maximum DC power source $V_{3B}$.

Also, the gate voltage of the switch Qd3 and the gate voltage of the switch Qd2 are the same, and the relation between the voltages $V_{3B}$ and $V_{2B}$ is defined as 3:1 by the value of only the ratio of the number of turns of the transformers. In this case, if the relation between the voltages $V_{3B}$ and $V_{2B}$ is $V_{3B}>3V_{2B}$, power is transmitted from the maximum DC power source $V_{3B}$ to the DC power source $V_{2B}$, and if it is $V_{3B}<3V_{2B}$, power is transmitted from the DC power source $V_{2B}$ to the maximum DC power source $V_{3B}$.

Since $V_{1B}$ can be controlled by changing Td and $V_{2B}$ is decided by the ratio of the number of turns of the transformers, both of the voltages $V_{1B}$ and $V_{2B}$ can be set at predetermined values. In such a bidirectional DC-DC converter 11, since the fly-back converter is connected between the maximum DC power source $V_{3B}$ and the DC power source $V_{1B}$, the voltages of the DC power source $V_{1B}$ and $V_{2B}$ can be set by using a small number of devices.

A bidirectional DC-DC converter 12 shown in FIG. 11(a) includes transformers, switches Qd1, Qd2 and Qd3, and a reset winding 13. Windings 12a, 12b and 12c of the transformers connected to the DC power sources $V_{1B}$, $V_{2B}$ and $V_{3B}$ are connected in such a manner that a forward converter is formed between the maximum DC power source $V_{3B}$ and the DC power source $V_{2B}$ and between the maximum DC power source $V_{3B}$ and the DC power source $V_{1B}$.

FIG. 11(b) shows gate voltages that serve as driving signals of the switches Qd1, Qd2 and Qd3.

The gate voltages of the switches Qd1, Qd2 and Qd3 are the same and the relation between the voltages $V_{1B}$, $V_{2B}$ and $V_{3B}$ is defined as 1:3:9 by the value of only the ratio of the number of turns of the transformers. In this case, if it is $V_{3B}>9V_{1B}$, power is transmitted from the maximum DC power source $V_{3B}$ to the DC power source $V_{1B}$, and if it is $V_{3B}<9V_{1B}$, power is transmitted from the DC power source $V_{1B}$ to the maximum DC power source $V_{3B}$. Also, if it is $V_{3B}>3V_{2B}$, power is transmitted from the maximum DC power source $V_{3B}$ to the DC power source $V_{2B}$, and if it is $V_{3B}<3V_{2B}$, power is transmitted from the DC power source $V_{2B}$ to the maximum DC power source $V_{3B}$. Thus, both of the voltages $V_{1B}$ and $V_{2B}$ can be set at predetermined values.

In such a bidirectional DC-DC converter 12, the forward converter is formed between the maximum DC power source $V_{3B}$ and the DC power source $V_{1B}$, and between the maximum DC power source $V_{3B}$ and the DC power source $V_{2B}$. Then the processing of excitation fluxes is carried out by the reset winding 13 near the maximum DC power source $V_{3B}$. Therefore, an excitation current can be reduced and core loss can be reduced.

A bidirectional DC-DC converter 14 shown in FIG. 12(a) includes transformers and switches Qd1, Qd2 and Qd3. Windings 14a, 14b and 14c of the transformers connected to the DC power sources $V_{1B}$, $V_{2B}$ and $V_{3B}$ are connected in such a manner that a fly-back converter is formed between the maximum DC power source $V_{3B}$ and the DC power source $V_{2B}$ and between the maximum DC power source $V_{3B}$ and the DC power source $V_{1B}$ FIG. 12(b) shows gate voltages that serve as driving signals of the switches Qd1, Qd2 and Qd3.

The gate voltage of the switch Qd3 and the gate voltages of the switches Qd1 and Qd2 are in the inverse relation, and the relation between the voltages $V_{1B}$, $V_{2B}$ and $V_{3B}$ is defined as 1:3:9 by the values of Td and the ratio of the number of turns of the transformers.

In this case, $V_{1B}$ and $V_{2B}$ can be securely controlled by changing Td. Thus, both of the voltages $V_{1B}$ and $V_{2B}$ can be stably controlled at predetermined values.

Embodiment 5

In the above Embodiment 1, the DC-DC converter 4 formed by the chopper circuits 7a and 7b carries out a unidirectional power supply operation in which it only supplies power from the maximum DC power source $V_{3B}$.

Figure 13:
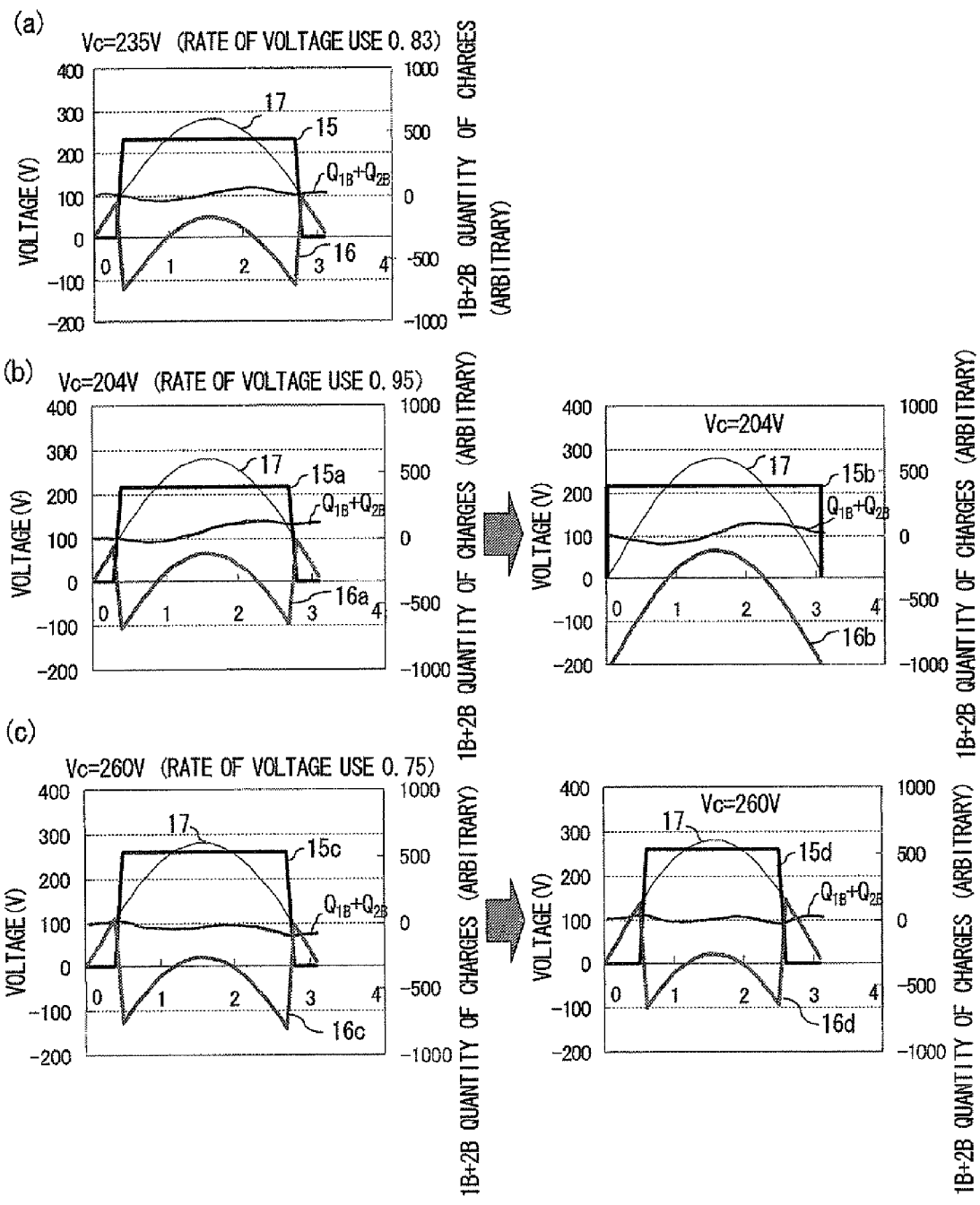
FIGS. 13(a), 13(b), and 13(c) are graphs for explaining adjustment of an output pulse according to Embodiment 5 of the invention.

In such a unidirectional DC-DC converter 4, power cannot be transmitted from the DC power sources $V_{2B}$ and $V_{1B}$ even when the voltage ratio of $V_{1B}$ and $V_{2B}$ increases. However, in this embodiment, the output pulse width of the maximum single-phase inverter 3B-INV is adjusted and the quantities of power of the DC power sources $V_{2B}$ and $V_{1B}$ are thus adjusted, as shown in FIG. 13.

Here, it is assumed that the maximum value (peak value) of the AC voltage $V_{out}$ outputted from the power conditioner is Vm, and that the rate of voltage use is equal to $Vm/(V_{1B}+V_{2B}+V_{3B})$. The relation between this rate of voltage use and the quantity of power fluctuation in the DC power sources $V_{1B}$ and $V_{2B}$ calculated by subtracting the quantity of charging from the quantity of discharging via the respective inverters will be described hereinafter. $Q_{1B}$ and $Q_{2B}$ are the quantities of charges that have flowed out of the DC power sources $V_{1B}$ and $V_{2B}$ due to discharging and charging via the single-phase inverters 1B-INV, 2B-INV and 3B-INV. It is known that when the voltage ratio of the DC power sources $V_{1B}$, $V_{2B}$ and $V_{3B}$ of the respective inverters is 1:3:9, if a current of sine wave with a power factor of 1 is caused to flow to a load connected to the power conditioner, the quantity of outflow charges ($Q_{1B}+Q_{2B}$), which is the total quantity of power fluctuation of the DC power sources $V_{1B}$ and $V_{2B}$ becomes zero at a rate of voltage use P (=about 0.83).

As shown in FIG. 13(a), when the output voltage Vc ($V_{3B}$) of the boosting chopper circuit 3 of the power conditioner is about 235 V, the rate of voltage use is about 0.83 and the quantity of outflow charges ($Q_{1B}+Q_{2B}$) from the DC power sources $V_{1B}$ and $V_{2B}$ is close to zero. A numeral 15 represents the output pulse of the maximum single-phase inverter 3B-INV, a numeral 16 represents the total output from the single-phase inverters 1B-INV and 2B-INV, and a numeral 17 represents the AC output voltage $V_{out}$ from the power conditioner.

Next, as shown in FIG. 13(b), when the voltage of solar light is lowered by a rise in the ambient temperature or the like and the output voltage Vc ($V_{3B}$) of the boosting chopper circuit 3 of the power conditioner is, for example, about 204 V, the rate of voltage use is about 0.95 and the quantity of outflow charges ($Q_{1B}+Q_{2B}$) from the DC power sources $V_{1B}$ and $V_{2B}$ increases. In such a case, if the output pulse width of the maximum single-phase inverter 3B-INV is increased, the power load of the single-phase inverters 1B-INV and 2B-INV is reduced and ($Q_{1B}+Q_{2B}$) becomes closer to zero. Numerals 15a and 15b represent the output pulse of the maximum single-phase inverter 3B-INV before and after the adjustment of the pulse width, and numerals 16a and 16b represent the total output of the single-phase inverters 1B-INV and 2B-INV before and after the adjustment of the pulse width.

Next, as shown in FIG. 13(c), when the voltage of solar light rises because of a drop in the ambient temperature or the like and the output voltage Vc ($V_{3B}$) of the boosting chopper circuit 3 of the power conditioner is, for example, about 260 V, the rate of voltage use is about 0.75 and the quantity of outflow charges ($Q_{1B}+Q_{2B}$) from the DC power sources $V_{1B}$ and $V_{2B}$ becomes negative. In such a case, if the output pulse width of the maximum single-phase inverter 3B-INV is narrowed, the power load of the single-phase inverters 1B-INV and 2B-INV increases and ($Q_{1B}+Q_{2B}$) becomes positive. Numerals 15c and 15d represent the output pulse of the maximum single-phase inverter 3B-INV before and after the adjustment of the pulse width, and numerals 16c and 16d represent the total output of the single-phase inverters 1B-INV and 2B-INV before and after the adjustment of the pulse width.

In this manner, the power load of the single-phase inverters 1B-INV and 2B-INV can be easily adjusted by the increase or decrease of the output pulse width of the maximum single-phase inverter 3B-INV. Therefore, the quantity of outflow charges ($Q_{1B}+Q_{2B}$) from the DC power sources $V_{1B}$ and $V_{2B}$ can be easily adjusted. In this case, if the single-phase inverters 1B-INV and 2B-INV are set to have DC voltages that are necessary for acquiring the total output of the single-phase inverters 1B-INV and 2B-INV, a predetermined output can be provided.

Thus, as shown in FIG. 13(c), even when Vc($V_{3B}$) rises and ($Q_{1B}+Q_{2B}$) becomes negative, the output pulse width of the maximum single-phase inverter 3B-INV can be narrowed to make ($Q_{1B}+Q_{2B}$) positive or zero. Thus, power need not be supplied from the DC power sources $V_{1B}$ and $V_{2B}$ to the maximum DC power source $V_{3B}$, and the voltages of the DC power sources $V_{1B}$ and $V_{2B}$ can be stably controlled by using the unidirectional DC-DC converter 4 that only supplies power from the maximum DC power source $V_{3B}$.

Moreover, as described above, since ($Q_{1B}+Q_{2B}$) can be easily adjusted by the increase or decrease of the output pulse width of the maximum single-phase inverter 3B-INV, ($Q_{1B}+Q_{2B}$) can be easily made closer to zero. Therefore, the power handled by the DC-DC converter 4 can easily be made closer to zero and efficiency improves. Such control can also be applied to the above Embodiment 4. The power handled by the bidirectional DC-DC converters 11, 12 and 14 can be made closer to zero and efficiency improves.

Embodiment 6

Next, the power conditioner having the similar circuit configuration shown in FIG. 1 in the above Embodiment 1, with improved efficiency of the boosting chopper circuit 3, will be described hereinafter.

Meanwhile, the maximum output voltage necessary for an AC output of 200 V is approximately 282 V. The output voltage $V_A$ of the inverter unit 1 can be $V_{1B}+V_{2B}+V_{3B}$ at the maximum. Therefore, if $V_{1B}+V_{2B}+V_{3B}$ is approximately 282 V or higher, the power conditioner can provide an AC output of 200 V. $V_{1B}+V_{2B}+V_{3B}$ is larger than $V_{3B}$, which is the voltage boosted by the boosting chopper circuit 3. For example, if the relation between $V_{1B}$, $V_{2B}$ and $V_{3B}$ is 2:2:9, $V_{1B}+V_{2B}+V_{3B}$ is 13/9 times $V_{3B}$. That is, when $V_{3B}$ is about 195 V or higher, $V_{1B}+V_{2B}+V_{3B}$ is 282 V or higher and this is the condition for an AC output.

If the solar light voltage $V_o$ is 195 V or higher, $V_{3B}$ is about 195 V or higher and a predetermined AC output can be provided without the boosting operation by the boosting chopper circuit 3. Therefore, in this embodiment, the IGBT switch 3a is turned on and off until the DC voltage (solar light voltage) $V_o$ acquired at the DC power source 2 reaches a predetermined voltage $V_{m1}$ (195 V), and the voltage is thus boosted to the voltage $V_{m1}$. When the predetermined voltage $V_{m1}$ is exceeded, the IGBT switch 3a is stopped to stop the boosting operation of the boosting chopper circuit 3.

As the solar light voltage $V_o$ increases, the boosting rate is lowered and the efficiency of the boosting chopper circuit 3 improves. However, when the IGBT switch 3a is stopped, the loss is significantly reduced and there is only a continuity loss of the diode 3c. Moreover, as the solar light voltage $V_o$ increases, the current is lowered and the continuity loss in the diode 3c is reduced.

In this embodiment, when the solar light voltage $V_o$ exceeds a predetermined voltage $V_{m1}$ (195 V), the IGBT switch 3a is stopped to stop the boosting operation. Therefore, the loss due to boosting can be significantly reduced as described above, and a power conditioner with high conversion efficiency can be provided. The predetermined voltage $V_{m1}$ at which the boosting operation is to stop may be about 195 V or higher, but the loss of the boosting chopper circuit 3 can be reduced further at a lower voltage.

Embodiment 7

Figure 14:
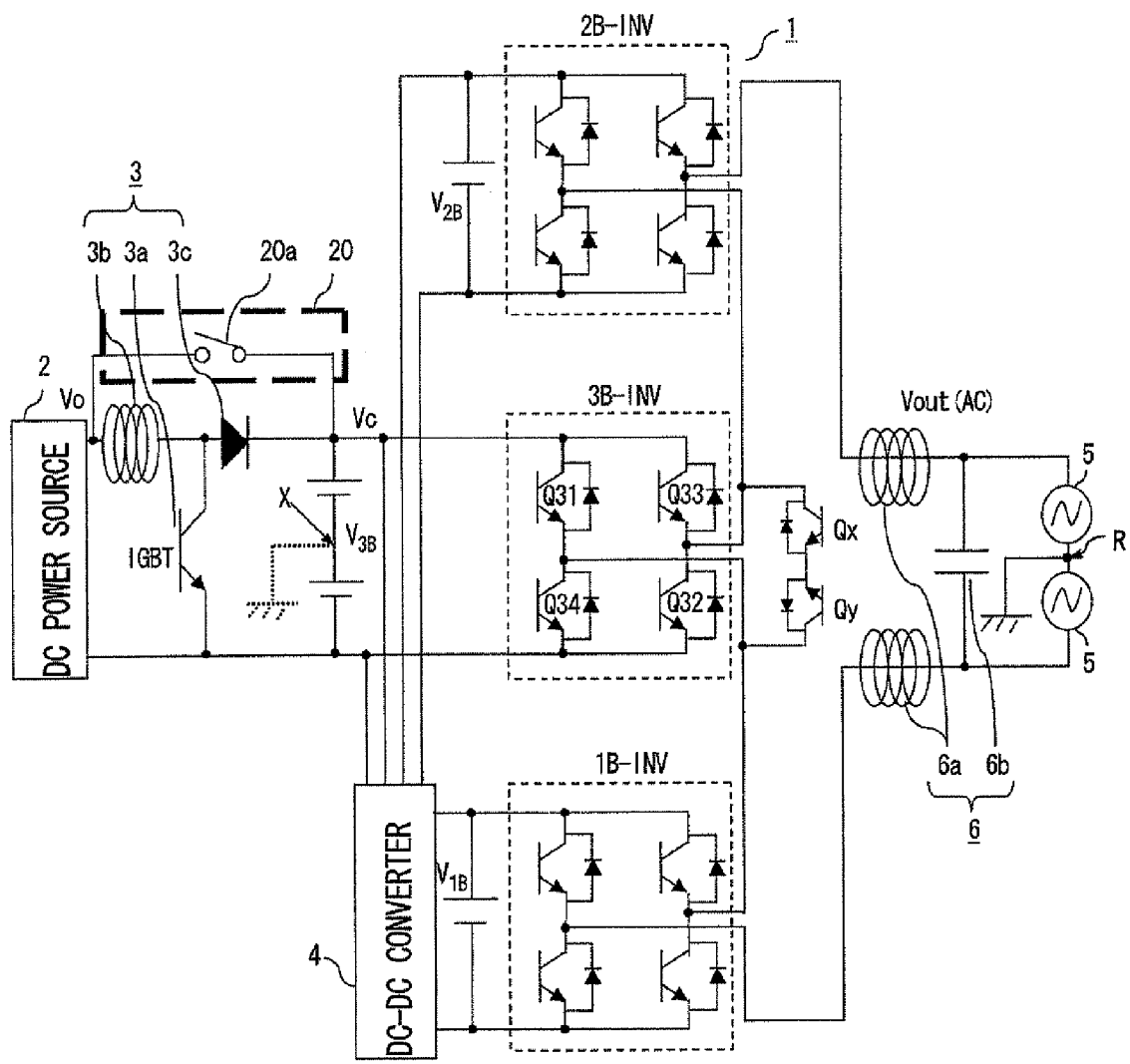
FIGS. 14 is a schematic configuration view showing a power conditioner according to Embodiment 7 of the invention.

FIG. 14 is a schematic configuration view showing a power conditioner according to Embodiment 7 of the invention. The power conditioner according to this embodiment is configured by providing a bypass circuit 20 that bypasses the boosting chopper circuit 3 in the power conditioner shown in FIG. 1 of the above Embodiment 1.

As shown in FIG. 14, the boosting chopper circuit 3 boosts a DC voltage $V_o$ acquired at the DC power source 2, and $V_{3B}$, which is the voltage of the maximum DC power source $V_{3B}$, is provided. Also, to bypass the boosting chopper circuit 3 when stopping the boosting, the bypass circuit 20 including, for example, a relay 20a, is connected parallel to the boosting chopper circuit 3.

In the boosting chopper circuit 3, as in the above Embodiment 6, the IGBT switch 3a is turned on and off until the DC voltage (solar light voltage) $V_o$ acquired at the DC power source 2, which serves as its input, reaches a predetermined voltage $V_{m1}$ (195 V), and it is thus boosted to the voltage $V_{m1}$.

During this time, the relay 20a of the bypass circuit 20 is left open. Then, the IGBT switch 3a is stopped when the predetermined voltage $V_{m1}$ is exceeded. At this point, the relay 20a of the bypass circuit 20 is closed and a current is caused to flow to the side of the bypass circuit 20, thus bypassing the reactor 3b and the diode 3c of the boosting chopper circuit 3.

In the range where the solar light voltage $V_o$ is equal to or less than the predetermined voltage $V_{m1}$, the boosting chopper circuit 3 carries out boosting so that the output voltage $V_{3B}$ becomes the predetermined voltage $V_{m1}$. Therefore, as the solar light voltage $V_o$ increases, the boosting rate is lowered and the efficiency of the boosting chopper circuit 3 improves. When the solar light voltage $V_o$ exceeds the predetermined voltage $V_{m1}$, the boosting operation stops and the relay 20a of the bypass circuit 20 is closed to cause a current to flow to the side of the bypass circuit 20. Therefore, there is little loss. Thus, the efficiency of the boosting chopper circuit 3 suddenly increases from the point where the solar light voltage $V_o$ reaches the voltage $V_{m1}$.

The predetermined voltage $V_{m1}$ at which the boosting operation should be stopped may be approximately 195 V or higher. However, a lower voltage enables further reduction in the power loss in the chopper circuit 3. After the boosting operation is stopped, not only the loss can be significantly reduced by the stop of the IGBT switch 3a, but also the continuity loss of the reactor 3b and the diode 3c can be eliminated by bypassing the reactor 3b and the diode 3c in the boosting chopper circuit 3. There is almost no loss in the boosting chopper circuit 3. Therefore, a power conditioner with high conversion efficiency can be provided.

The bypass circuit 20 in the above Embodiment 7 will be described in detail hereinafter with reference to FIG. 15 to FIG. 17.

The bypass circuit 20 includes the relay 20a and bypasses one or both of the reactor 3b and the diode 3c connected in series in the boosting chopper circuit 3.

Figure 15:
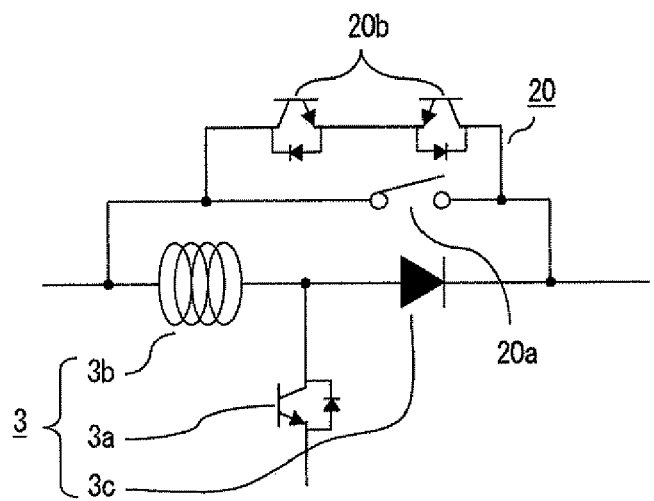
FIG. 15 is a configuration view showing a bypass circuit according to Embodiment 7 of the invention.

FIG. 15 shows a bypass circuit 20 in which the relay 20a bypasses the reactor 3b and the diode 3c, as shown in FIG. 14 in the above Embodiment 7. FIG. 16 shows a bypass circuit 20 according to another example, in which the relay 20a bypasses only the diode 3c. FIG. 17 shows a bypass circuit 20 according to another example, in which the relay 20a bypasses only the reactor 3b.

Also, a self-turn-off semiconductor switch 20b is connected parallel to the relay 20a. Since the relay 20a usually opens with zero current or a low voltage, a DC current is difficult to interrupt. However, it can be easily interrupted when the semiconductor switch 20b is thus provided in parallel. In this case, the semiconductor 20b is turned on at the same time as the relay 20a is opened, and the current is temporarily shifted to the semiconductor switch 20b. Thus, the current flowing through the relay 20a is interrupted, and the semiconductor switch 20b is turned off after that.

In any case, when the solar light voltage $V_o$ exceeds the predetermined voltage $V_{m1}$, the IGBT switch 3a is stopped to stop the boosting operation, and the relay 20a of the bypass circuit 20 is closed to cause the current to flow to the side of the bypass circuit 20.

In the case of FIG. 15, since the reactor 3b and the diode 3c in the boosting chopper circuit 3 are bypassed, the continuity loss of the reactor 3b and the diode 3c can be eliminated and the overall efficiency of the power conditioner increases.

Figure 16:
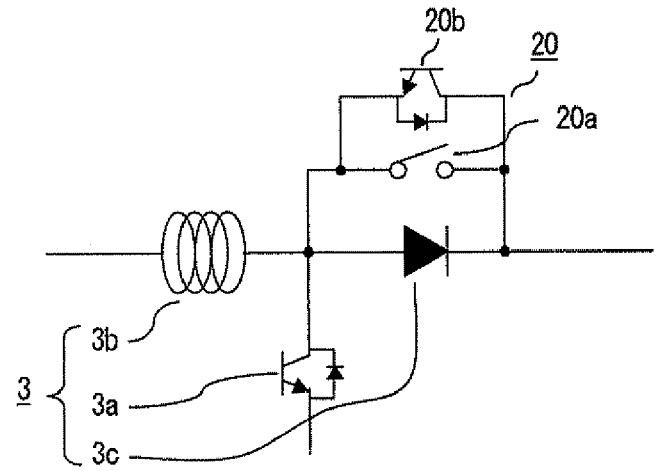
FIG. 16 is a configuration view showing another example of a bypass circuit according to Embodiment 7 of the invention.

In the case of FIG. 16, since only the diode 3c in the boosting chopper circuit 3 is bypassed, the continuity loss of the diode 3c can be eliminated and the overall efficiency of the power conditioner increases. In this case, since the reactor 3b is not bypassed, the reactor 3b can be used as a filter.

In FIG. 15 and FIG. 16, since the diode 3c is bypassed, when the DC power source $V_{3B}$ gets higher than the solar light voltage $V_o$, reversal of the current occurs, and additionally, a reverse voltage is applied to the solar panel, which is the DC power source 2. There is a risk of damage to the panel. Therefore, a configuration is made that detects the current flowing through the relay 20a, and that opens the relay 20a when the current becomes a predetermined value or less, in order to switch to the current path via the reactor 3b and the diode 3c. As the relay 20a is thus opened to make the function of the diode 3c effective, the functions of preventing reversal of the current and of protecting the solar panel from the reverse voltage are provided.

When the relay 20a is opened, even if a reverse current has already been generated because of delay in detection, the current can be temporarily shifted to the semiconductor switch 20b and thus can be securely interrupted.

Figure 17:
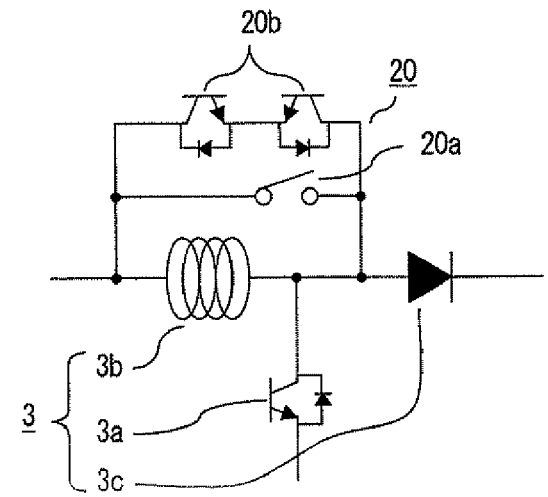
FIG. 17 is a configuration view showing second another example of a bypass circuit according to Embodiment 7 of the invention.

In the case of FIG. 17, since only the reactor 3b in the boosting chopper circuit 3 is bypassed, the continuity loss of the reactor 3b can be eliminated and the overall efficiency of the power conditioner increases. Also, since the diode 3c is not bypassed, reversal of the current can be prevented and the solar panel can be protected from the reverse voltage by the diode 3c, and reliability can be easily improved. In this case, the relay 20a can be shut off without having the semiconductor switch 20b provided. However, as the semiconductor switch 20b is provided, the relay 20a can also be shut off when anomaly occurs in the diode 3c.

INDUSTRIAL APPLICABILITY

The invention can be broadly applied to an uninterruptible power supply apparatus that boosts a DC voltage of a decentralized power source such as solar light to a required voltage and then converts it to AC and links it to a system, or an inverter apparatus that supplies AC power after conversion to a load.

The invention claimed is:

1. A power conversion apparatus comprising:
a plurality of single-phase inverters, each single-phase inverter including switching devices, receiving DC power from a respective DC power source and producing AC power at an AC-output side, the AC-output sides of the plurality of single-phase inverters being connected in series, wherein the apparatus produces an output voltage that is a sum of respective output voltages generated by the plurality of single-phase inverters; and
a DC-DC converter, wherein
first and second DC power sources of the DC power sources supply DC power to first and second single-phase inverters, the first and second single-phase inverters having their AC-output sides connected to each other, of the plurality of single-phase inverters,
the first and second DC power sources are connected to each other via the DC-DC converter, and
the DC-DC converter supplies power from the first DC power source, having higher DC voltage than the second DC power source, to the second DC power source via the switching devices in the first and second single-phase inverters.

2. The power conversion apparatus according to claim 1, wherein the DC-DC converter includes a chopper circuit including a reactor, a rectifying device, and a switch.

3. The power conversion apparatus according to claim 2, wherein, during an operation period when the first single-phase inverter that receives DC power from the first DC power source, turns on the switching devices that connect a positive electrode of the first DC power source to an AC output power line, the switch in the chopper circuit is turned on and off.

4. The power conversion apparatus according to claim 2, wherein
the first DC power source has the highest DC voltage of the DC power sources and the highest DC voltage is generated from a third DC power source,
the first single-phase inverter, receiving DC power from the first DC power source, includes two AC-ouput terminals, each AC-output terminal connected to the respective second single-phase inverter receiving DC power from the respective second DC power source, and
each second DC power source is connected to the first DC power source via a respective chopper circuit, and is supplied with power from the first DC power source via the switching devices in the first and second single-phase inverters.

5. The power conversion apparatus according to claim 4, wherein output pulse width of the first single-phase inverter is adjusted, and total power fluctuation calculated by subtracting charging from discharging via the single-phase inverters of the DC power sources, other than the first DC power source, is positive or zero.

6. The power conversion apparatus according to claim 5, wherein output pulse width of the first single-phase inverter is adjusted so that the total power fluctuation is reduced.

7. The power conversion apparatus according to claim 4, including a magnetic coupling core of a magnetic material magnetically coupling two reactors in the chopper circuits.

8. The power conversion apparatus according to claim 7, wherein the two reactors include windings configured so that polarities of electromotive forces induced by the reactors are in the same direction.

9. The power conversion apparatus according to claim 7, wherein the two reactors include windings configured so that polarities of electromotive forces induced by the reactors are in opposite directions, and including a gap for adjusting the magnetic coupling and located in the magnetic coupling core.

10. The power conversion apparatus according to claim 2, wherein
the single-phase inverters are connected in ascending or descending order of DC voltages of the DC power sources that supply DC power,
a maximum DC power source of DC power sources has the highest DC voltage of the DC power sources and the highest DC voltage is generated from a third power source,
the plurality of single-phase inverters include a plurality of pairs of the first and second single-phase inverters having their AC-output sides connected to each other and receiving DC power from a respective pair of the first and second DC power sources,
the first and second DC power sources of each pair are connected to each other via a respective chopper circuit, and
each chopper circuit supplies power from the first DC power source, having higher DC voltage than the second DC power source, to the second DC power source via the switching devices in the first and second single-phase inverters, so that each of the DC power sources, other than the maximum DC power source, is supplied with power.

11. The power conversion apparatus according to claim 10, wherein output pulse width of the single-phase inverter receiving DC power from the maximum DC power source is adjusted, and total power fluctuation calculated by subtracting charging from discharging via the single-phase inverters of the DC power sources, other than the maximum DC powers source, is positive or zero.

12. The power conversion apparatus according to claim 11, wherein output pulse width of the first single-phase inverter is adjusted so that the total power fluctuation is reduced.

13. The power conversion apparatus according to claim 1, including a boosting circuit having a switch wherein
a maximum DC power source of the DC power sources has the highest DC voltage of the DC power sources,
the highest DC voltage is generated from a third DC power source via the boosting circuit, and
when the voltage of the third DC power source exceeds a predetermined voltage, on-off operation of the switch in the boosting circuit is stopped to stop boosting.

14. The power conversion apparatus according to claim 13, including a bypass circuit that bypasses the boosting circuit and, when the voltage of the third DC power source exceeds the predetermined voltage, on-off operation of the switch in the boosting circuit is stopped to stop boosting and the boosting circuit is bypassed by the bypass circuit.

15. The power conversion apparatus according to claim 14, wherein the bypass circuit includes a relay.

16. The power conversion apparatus according to claim 1, wherein a predetermined AC voltage and AC current are output and supplied to a load.

17. The power conversion apparatus according to claim 1, wherein a predetermined AC output is connected in parallel with an AC system and linked to the AC system.

* * * * *